(12) United States Patent
Stefanopoulou et al.

(10) Patent No.: US 11,660,980 B2
(45) Date of Patent: May 30, 2023

(54) ENERGY CONSCIOUS WARM-UP OF LITHIUM-ION CELLS FROM SUB-ZERO TEMPERATURES

(71) Applicants: Anna G. Stefanopoulou, Ann Arbor, MI (US); Shankar Narayan Mohan, Ann Arbor, MI (US); Youngki Kim, Ann Arbor, MI (US); Jason B. Siegel, Ann Arbor, MI (US); Yi Ding, Canton, MI (US); Wesley G. Zanardelli, Rochester, MI (US); Sonya Zanardelli, Rochester, MI (US)

(72) Inventors: Anna G. Stefanopoulou, Ann Arbor, MI (US); Shankar Narayan Mohan, Ann Arbor, MI (US); Youngki Kim, Ann Arbor, MI (US); Jason B. Siegel, Ann Arbor, MI (US); Yi Ding, Canton, MI (US); Wesley G. Zanardelli, Rochester, MI (US); Sonya Zanardelli, Rochester, MI (US)

(73) Assignees: THE REGENTS OF THE UNIVERSITY OF MICHIGAN, Ann Arbor, MI (US); GOVERNMENT OF THE UNITED STATES, AS REPRESENTED BY THE SECRETARY OF THE ARMY, Washington, VA (US)

(*) Notice: Subject to any disclaimer, the term of this patent is extended or adjusted under 35 U.S.C. 154(b) by 0 days.

(21) Appl. No.: 14/959,805

(22) Filed: Dec. 4, 2015

(65) Prior Publication Data
US 2016/0185251 A1    Jun. 30, 2016

Related U.S. Application Data

(60) Provisional application No. 62/087,589, filed on Dec. 4, 2014.

(51) Int. Cl.
*H02J 7/00*    (2006.01)
*B60L 58/27*    (2019.01)
(Continued)

(52) U.S. Cl.
CPC ......... *B60L 58/27* (2019.02); *H01M 10/0525* (2013.01); *H01M 10/425* (2013.01);
(Continued)

(58) Field of Classification Search
CPC .. H02J 7/35; H02J 7/355; H02J 7/0042; H02J 7/34; Y02E 60/12; Y02E 60/122;
(Continued)

(56) References Cited

U.S. PATENT DOCUMENTS 5,163,135 A    11/1992    Nakamura et al.
6,392,388 B1    5/2002    Young
(Continued)

FOREIGN PATENT DOCUMENTS

| CA | 2806628 A1 | 2/2012 |
| EP | 2084770 B1 | 12/2010 |
| WO | 0060691 A1 | 10/2000 |

OTHER PUBLICATIONS

Benson, et al., A Branch and Bound-Outer Approximation Algorithm for Concave Minimization Over a Convex Set, Computers Math. Applic., 1991, 21(6/7):167-76.
(Continued)

*Primary Examiner* — Yalkew Fantu
(74) *Attorney, Agent, or Firm* — Quarles & Brady LLP

(57) ABSTRACT

There is disclosed an electrical device and a method in which a battery is warmed up when operating from a sub-zero temperature. The electrical device may include a battery; an electrical storage element; and a battery management system including a controller in electrical communication with the battery and the electrical storage element. The controller can be configured to execute a program stored in the controller to shuttle energy between the battery and the electrical storage element until a power capability threshold of the battery has been reached, Shuttling the energy raises a temperature of the battery to meet power demand.

19 Claims, 13 Drawing Sheets

(51) Int. Cl.
*H01M 10/615* (2014.01)
*H01M 10/44* (2006.01)
*H01M 10/0525* (2010.01)
*H01M 10/42* (2006.01)
*H02J 7/34* (2006.01)

(52) U.S. Cl.
CPC ......... *H01M 10/44* (2013.01); *H01M 10/615* (2015.04); *H02J 7/0042* (2013.01); *H02J 7/34* (2013.01); *H01M 2220/20* (2013.01); *Y02E 60/10* (2013.01); *Y02T 10/70* (2013.01)

(58) Field of Classification Search
CPC ............. H01M 10/465; H01M 16/006; H01M 10/615; H01M 10/0525; H01M 10/425; H01M 10/44; H01M 2220/20; B60L 11/1875; Y02T 10/7011
USPC ........................................................ 320/101
See application file for complete search history.

(56) References Cited

U.S. PATENT DOCUMENTS

| | | | |
|---|---|---|---|
| 6,674,265 B2 | 1/2004 | Yoshida et al. | |
| 2003/0027036 A1* | 2/2003 | Emori | H01M 2/34 429/61 |
| 2005/0196662 A1 | 9/2005 | Prema et al. | |
| 2007/0046261 A1* | 3/2007 | Porebski | G01R 31/3865 320/132 |
| 2007/0145949 A1* | 6/2007 | Matsushima | H02J 7/00 320/132 |
| 2007/0210769 A1 | 9/2007 | Tsutsumi et al. | |
| 2007/0236181 A1* | 10/2007 | Palladino | H01M 10/486 320/130 |
| 2008/0081224 A1* | 4/2008 | Burch | B60L 58/34 429/429 |
| 2008/0197801 A1* | 8/2008 | Manor | H02J 7/342 320/103 |
| 2008/0233469 A1* | 9/2008 | Drozdz | H01M 10/052 429/61 |
| 2008/0278115 A1* | 11/2008 | Huggins | B60L 3/12 320/134 |
| 2009/0189613 A1* | 7/2009 | Plett | G01R 31/3624 324/426 |
| 2010/0201322 A1 | 8/2010 | Stanley | |
| 2010/0305793 A1* | 12/2010 | Kidston | B60W 10/26 701/22 |
| 2011/0012562 A1 | 1/2011 | Paryani | |
| 2011/0062913 A1* | 3/2011 | Lin | H02J 7/0029 320/101 |
| 2011/0291621 A1* | 12/2011 | Iles | H01M 10/4257 320/145 |
| 2012/0025773 A1 | 2/2012 | Wang et al. | |
| 2012/0105010 A1 | 5/2012 | Kinoshita | |
| 2012/0176082 A1* | 7/2012 | Lee | H01M 10/425 320/103 |
| 2012/0261397 A1 | 10/2012 | Schwarz et al. | |
| 2012/0305662 A1 | 12/2012 | Miyano | |
| 2013/0013235 A1 | 1/2013 | Takahashi | |
| 2013/0041538 A1 | 2/2013 | Jin et al. | |
| 2014/0002031 A1 | 1/2014 | Chaturvedi et al. | |
| 2014/0006807 A1* | 1/2014 | Oglesby | G06F 1/263 713/300 |
| 2014/0035531 A1* | 2/2014 | Garnier | B60L 58/18 320/118 |
| 2014/0266036 A1* | 9/2014 | Jung | G01R 29/0814 320/108 |
| 2014/0285135 A1 | 9/2014 | Ji et al. | |
| 2015/0175019 A1* | 6/2015 | Dextreit | B60L 53/65 320/109 |
| 2016/0129797 A1* | 5/2016 | Jackson | B60L 11/1816 320/109 |
| 2016/0131714 A1* | 5/2016 | Kuusisto | B60L 11/1861 702/63 |

OTHER PUBLICATIONS

Burer, et al., Non-Convex Mixed-Integer Nonlinear Programming: A Survey, Surveys in Operations Research and Management Science, 2012, 17:97-106.

Doyle, et al., Modeling of Galvanostatic Charge and Discharge of the Lithium / Polymer / Insertion Cell, Journal of the Electrochemical Society, 1993, 140(6):1526-1533.

Horst, On the Global Minimization of Concave Functions, OR Spektrum, 1984, 6(4):195-205.

Hu, et al., Model-Based Dynamic Power Assessment of Lithium-Ion Batteries Considering Different Operating Conditions, IEEE Transactions on Industrial Informatics, 2014, 10(3):1948-1959.

Huang, et al., An Online Battery Impedance Measurement Method Using DC-DC Power Converter Control, IEEE Transactions on Industrial Electronics, 2014, 61(11):15987-5995.

Inoa, et al., PHEV Charging Strategies for Maximized Energy Saving, IEEE Transactions on Vehicular Technology, 2011, 60(7):2978-2986.

Ji, et al., Li-Ion Cell Operation at Low Temperatures, Journal of the Electrochemical Society, 2013, 160(4):A636-A649.

Ji, et al., Heating Strategies for Li-Ion Batteries Operated from Subzero Temperatures, Electrochi mica Acta, 2013, 107:664-674.

Jiang, et al., Evaluation of Acceptable Charging Current of Power Li-Ion Batteries Based on Polarization Characteristics, IEEE Transactions on Industrial Electronics, 2014, 61(12):6844-6851.

Kim, et al., The Estimation of Temperature Distribution in Cylindrical Battery Cells Under Unknown Cooling Conditions, IEEE Transactions on Control Systems Technology, 2014, 22(6):2277-2286.

Lin, et al., A Lumped-Parameter Electro-Thermal Model for Cylindrical Batteries, Journal of Power Sources, 2014, 257:1-11.

Liu, et al., Search for an Optimal Rapid-Charging Pattern for Li-Ion Batteries Using the Taguchi Approach, IEEE Transactions on Industrial Electronics, 2010, 57(12):3963-3971.

Miohan, et al., On the Warmup of Li-Ion Cells from Sub-Zero Temperatures, 2014 American Control Conference, pp. 1547-1552.

Muller, et al., How Good is Quantized Model Predictive Control With Horizon One?, IEEE Transactions on Automatic Control, 2011, 56(11):2623-2638.

Rahimi-Eichi, et al., Battery Management System: An Overview of Its Application in the Smart Grid and Electric Vehicles, IEEE Industrial Electronics Magazine, 2013, 7(2):4-16.

Savoye, et al., Impact of Periodic Current Pulses on Li-Ion Battery Performance, IEEE Transactions on Industrial Electronics, 2012, 59(9):3481-3488.

Schmidt, et al., Experiment-Driven Electrochemical Modeling and Systematic Parameterization for a Lithium-Ion Battery Cell, Journal of Power Sources, 2010, 195(15):5071-5080.

Tippmann, et al., Low-Temperature Charging of Lithium-Ion Cells Part I: Electrochemical Modeling and Experimental Investigation of Degradation Behavior, Journal of Power Sources, 2014, 252:305-316.

Idaho National Laboratory, Battery Test Manual for Plug-In Hybrid Electric Vehicles, Dec. 2010, INL/EXT-07-12536, Rev. 2, 71 pages.

PCT International Search Report and Written Opinion, PCT/US2015/064032, dated Apr. 29, 2016, 8 pages.

* cited by examiner

ENERGY CONSCIOUS WARM-UP OF LITHIUM-ION CELLS FROM SUB-ZERO TEMPERATURES

CROSS-REFERENCES TO RELATED APPLICATIONS

This application claims priority from U.S. Patent Application No. 62/087,589 filed Dec. 4, 2014.

STATEMENT REGARDING FEDERALLY SPONSORED RESEARCH

This invention was made with government support under number W56HZV-14-2-0001 awarded by the U.S. Army. The government has certain rights in the invention.

BACKGROUND OF THE INVENTION

1. Field of the Invention

This invention relates to a device and a method in which a battery is warmed up when operating from a sub-zero temperature.

2. Description of the Related Art

The use of Lithium-ion (Li-ion) battery technologies has recently enjoyed widespread adoption in consumer electronics and automotive/aerospace applications. The archetype of rechargeable technology, Li-ion batteries, has over the last decade benefited from improvements in material science through increased energy and power density [see reference 1]. Li-ion batteries, although widely adopted, suffer from significant performance degradation at low temperatures ($\leq -10°$ C.) posing a challenge for automotive applications (refer to references [2] and [3] for electrochemistry based reasons). It is documented that at low temperatures, the discharge capability of Lithium-ion cells can be less than 70% of that at room temperature. It has been proposed that the reduction in electrode and electrolyte diffusivity, decrease in reaction kinetics and loss of available lithium owing to plating and absorption into the solid electrolyte interface layer are the most likely reasons.

Improvement to sub-zero performance through changes in design and construction of cells have been pursued, but these do not fully solve the issue. Warming cells in an effort to improve cell performance is a practice in the context of secondary batteries. Battery warm-up techniques can be broadly classified as: (1) jacket/resistive/external heat-up; and (2) internal heating using high-frequency bidirectional currents. Ji et al. in [reference 4] compare different heating strategies and conclude that for Li-ion cells, internal heating is more effective than using external heating elements if no external power source is utilized, a scenario we term as "standalone" and is of consideration in this disclosure. Most techniques discussed in literature strive to warm the cell until a certain pre-specified cell temperature is reached. Unfortunately, current solutions do not fully address the performance degradation of Li-ion batteries at sub-zero temperatures.

Therefore, what is needed is an improved device and methods for the energy conscious warm-up of lithium-ion cells from sub-zero temperatures.

SUMMARY OF THE INVENTION

The present disclosure meets the foregoing needs. Since in most battery applications, the cell serves as a source of power, we use the cell's pulse power capability, instead of the temperature, as a condition to terminate the warm-up operation. In addition, we reach the necessary power capability in an energy efficient manner.

Pulse power capability or state-of-power (SOP) is an estimated quantity whose accuracy is determined by the fidelity of the model that captures the electrical dynamics of the cell. Modeling the electrical behavior of Li-ion cells at subzero temperatures, particularly at high current rates, is more challenging than emulating its thermal dynamics [3]. Thus, owing to the inherent relation between operating temperature and power capability, in this disclosure, temperature rise is taken as a measurable surrogate. Then, the stated objective of increasing power capability can be re-written as one of effecting temperature rise in an energy conscious manner until the desired power can be delivered.

Maximizing temperature rise while regulating energy loss provides for certain desirable characteristics of the battery current. Heat generated being proportional to the input current, the candidate current profile is selected to be bi-directional to minimize cumulative discharge and achieve fast warm-up. Drawing bi-directional currents makes it preferred that a temporary energy reservoir for energy shuttling, such as an ultra-capacitor or another battery, be available. Since the bi-directional current includes a charging phase, it is important to note that charging the cell at low temperatures is challenging and imposes stringent charging current constraints (see references [5], [6] for challenges at room temperature).

Charging Li-ion cells at sub-zero temperatures is difficult because of the reduced diffusivity in the anode that results in increased polarization and a drop in electrode overpotential [see reference 7]. From a control perspective, the propensity of charging currents to cause plating can be minimized by actively regulating the electrode overpotential. In this disclosure, the anode polarization is indirectly controlled by enforcing the magnitude of charging currents to be less than the discharging portion of the pulse.

This disclosure demonstrates computationally efficient models to improve the power capability of Li-ion cells in an energy efficient manner. Lithium ion battery cells suffer from significant performance degradation at sub-zero temperatures. This disclosure presents a Predictive Control based technique that exploits the increased internal resistance of Li-ion cells at sub-zero temperatures to increase the cell's temperature until the desired power can be delivered. Specifically, the magnitude of a sequence of bidirectional currents is optimized such as to minimize total energy discharged. The magnitude of current is determined by solving an optimization problem that satisfies the battery manufacturer's voltage and current constraints. Drawing bidirectional currents makes it preferred that a temporary energy reservoir for energy shuttling, such as an ultra-capacitor or another battery, be available. When compared with the case when no penalty on energy withdrawn is imposed, simulations indicate that reductions of up to 20% in energy dispensed as heat in the battery as well as in the size of external storage elements can be achieved at the expense of longer warm-up operation time.

Li-ion battery packs suffer from significant performance degradation when operating in cold conditions. Performance degradation manifests itself in the form of limited current or power delivered by the pack. We disclose herein a methodology to automate the warm-up of Li-ion battery packs when operating from sub-zero temperatures. The automation involves an algorithm that performs a tradeoff between warm-up time and associated energy loss. The warm-up procedure uses an auxiliary energy storage element such as an ultra-capacitor bank and or another battery. Warm-up is achieved by shuttling energy between the battery of interest and the auxiliary storage element. The magnitude of current is computed by solving a real-time predictive optimization problem that utilizes a model of the cell dynamics—both electrical and thermal. The algorithm can allow the user to enter the desired departure time and will minimize the total energy dissipated by auto-starting the warm-up process at the appropriate time.

The warm-up routine and algorithm of the present disclosure will allow for widespread use of Li-ion batteries in electric vehicles and hybrid electric vehicles as well as in other consumer and industrial products without concern for performance at sub-zero temperatures. Non-limiting example applications include commercial automobiles, experimental equipment used in harsh and cold climates, space vehicles, industrial power tools, healthcare equipment, consumer devices, and military applications. Some advantages are: (i) use of power as an indicator for when warm-up is complete, (ii) regulation of current for reduction of losses, (iii) size of external energy storage, (iv) automatic calculation of tradeoff between operation time and energy savings, and (v) user-controlled pre-warming.

These and other features, aspects, and advantages of the present invention will become better understood upon consideration of the following detailed description, drawings and appended claims.

DETAILED DESCRIPTION OF THE INVENTION

Figure 12:
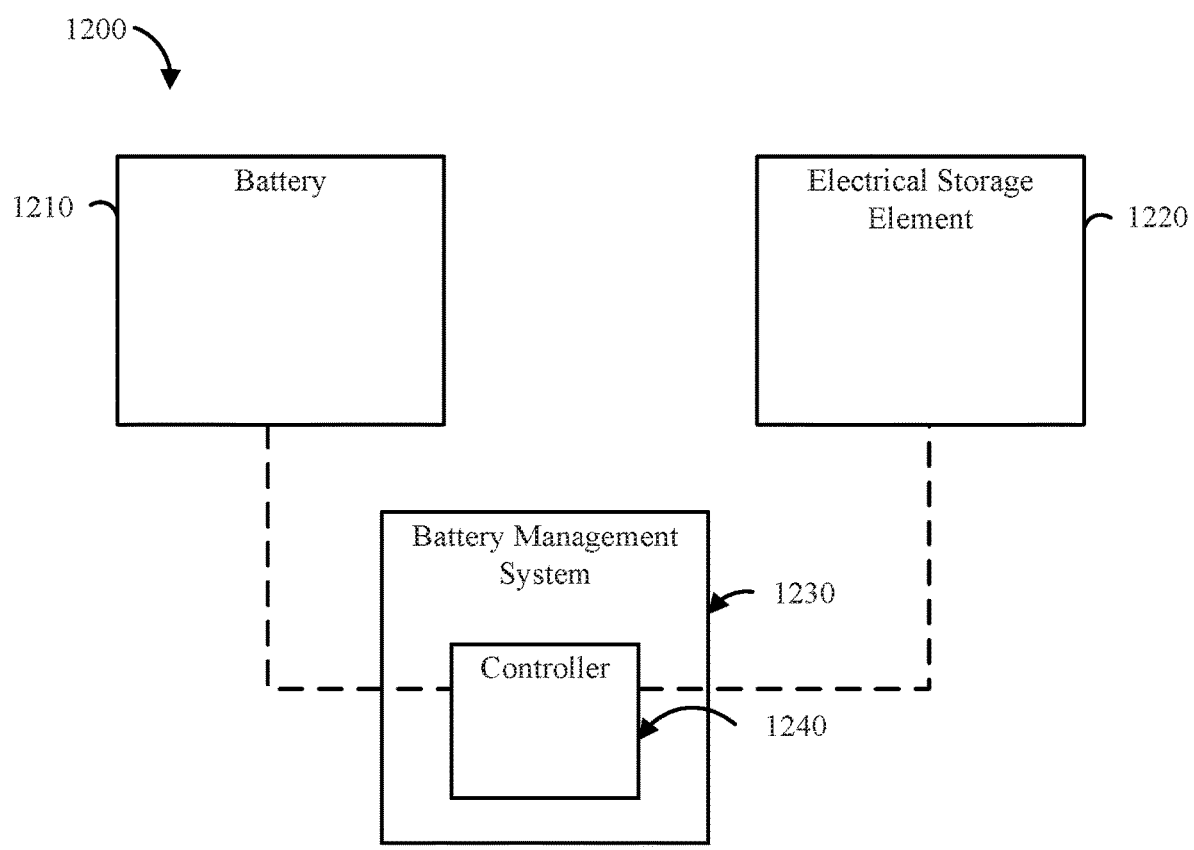
FIG. 12 shows an electrical device for shuttling energy between a battery and an electrical storage element.

In one aspect, the invention of FIG. 12 provides an electrical device 1200 including a battery 1210; an electrical storage element 1220; and a battery management system 1230 including a controller 1240 in electrical communication with the battery 1210 and the electrical storage element 1220. The controller 1240 can be configured to execute a program stored in the controller 1240 to shuttle energy between the battery 1210 and the electrical storage element 1220 until a power capability threshold of the battery 1210 has been reached. Shuttling the energy raises a temperature of the battery 1210.

The electrical storage element of the device may store energy electrostatically (e.g., an ultracapacitor). The electrical storage element of the device may store energy electrochemically (e.g., a rechargeable battery).

The controller may execute the program stored in the controller to determine an initial temperature of the battery before shuttling the energy, and then shuttling the energy occurs if the initial temperature of the battery is below a temperature threshold. The temperature threshold may be 5° C., or 0° C., or −5° C., or −10° C., or −15° C., or −20° C., or −25° C. Energy may be shuttled using a bi-directional current. The program stored on the controller can be configured to determine the power capability based on at least one of: (a) a minimum terminal voltage constraint of a cell of the battery, (b) a maximum terminal voltage constraint of a cell of the battery, (c) a minimum current constraint of a cell of the battery, or (d) a maximum current constraint of a cell of the battery.

The power capability can be defined as a product of a maximum continuous current that can be drawn over a fixed time interval from the battery without violating any current constraint, any voltage constraint, and any state of charge constraint. The voltage constraint can be one or both of a minimum permissible terminal voltage and a maximum permissible terminal voltage of a cell of the battery. A charging current of the shuttling of the energy can be less than a discharge current of the shuttling of the energy.

The controller may execute the program stored in the controller to shuttle energy between the battery and the electrical storage element such that the power capability threshold is reached at a time inputted into the controller. Shuttling the energy raises the temperature of the battery to meet power demand.

The controller may be configured to execute a program stored in the controller to: (i) cycle between a discharging phase in which current flows from the battery to the electrical storage element and a charging phase in which current flows from the electrical storage element to the battery, and (ii) continue cycling between the discharging phase and the charging phase until a power capability threshold of the battery has been reached. Cycling between the discharging phase and the charging phase raises a temperature of the battery to meet power demand. When the power capability threshold of the battery has been reached, cycling can be terminated.

An electrical device of the invention including a battery and a battery management system has many uses. In one non-limiting example, the electrical device including a battery and a battery management system is used in electric vehicles. Hybrid electric vehicles use both an internal combustion engine for propulsion and high voltage battery power for traction. Plug-in electric vehicles can be charged from an external source of electricity, and the stored energy is used to power the vehicle. Battery management systems for electric vehicles may include an electronic controller to monitor various parameters associated with the operation of the battery. For example, temperature, pressure, current, voltage, capacity, and so forth can be monitored by the controller of the battery management system. Battery management systems are a component of electric vehicles and hybrid electric vehicles that impact the efficiency and safety of the vehicles. The battery management system acts as the control center that interfaces with on-board automotive systems to ensure safety. The battery management system monitors the battery parameters, protects the cells from damage, and works to improve battery life.

The electrical device of the invention can be configured to supply electrical power to propel a vehicle, or to supplement propulsion or electric load in a vehicle. The vehicle may comprise an internal combustion engine, a generator, and a fuel tank storing fuel, wherein the internal combustion engine is configured to combust the fuel from the fuel tank to power the generator, and wherein the generator is configured to supply electrical power to the battery. In non-limiting examples, the electrical device including a battery and a battery management system can be used in a consumer electronics apparatus, a satellite system, a mechanized apparatus, a spacecraft system, or a power tool.

The controller of the battery management system may include a memory (e.g., ROM, RAM, flash memory, cache, a combination thereof, or other suitable computer or machine-readable memory or media) capable of storing instructions (e.g., software), mathematical formulas and/or equations, look-up tables, and the like. Further, the controller of the battery management system may include a processor which may be any suitable microprocessor capable of executing instructions stored in the memory and/or performing calculations. The controller of the battery management system may generally receive information from sensors (e.g., temperature sensors, current sensors, voltage sensors) disposed in the battery.

In one version of the electrical device, the battery includes a plurality of electrochemical cells (e.g., lithium-ion cells, nickel-metal-hydride cells, lithium polymer cells, etc., or other suitable types of electrochemical cells). The battery may comprise a battery pack including a series of battery cells. The battery may be a lithium ion battery pack. The battery may include a plurality of cells, or a single cell. The cell or cells may be selected from: prismatic cells, or cylindrical cells, or pouch cells. Each cell may comprise: a positive electrode selected from lithium nickel manganese cobalt oxide, lithium manganese oxide, and lithium iron phosphate; and a negative electrode selected from graphite, lithium titanate, hard carbon, tin/cobalt alloy, and silicon carbon; and an electrolyte selected from $LiPF_6$, $LiBF_4$, and $LiClO_4$.

In another aspect, the invention provides a method for heating a battery. In the method, a battery is placed in electrical communication with an electrical storage element, and a bi-directional current shuttles energy between the energy storage element and the battery, wherein energy is shuttled until a power capability threshold of the battery has been reached. The method may include the step of determining an initial temperature of the battery before cycling, and then cycling occurs if the initial temperature of the battery is below a temperature threshold. The temperature threshold may be 5° C., or 0° C., or −5° C., or −10° C., or −15° C., or −20° C., or −25° C. The method may use pulsed currents. The step of determining the power capability can be based on at least one of (a) a minimum terminal voltage constraint of a cell of the battery, (b) a maximum terminal voltage constraint of a cell of the battery, (c) a minimum current constraint of a cell of the battery, or (d) a maximum current constraint of a cell of the battery. The power capability can be defined as a product of a maximum continuous current that can be drawn over a fixed time interval from the battery without violating any current constraint, any voltage constraint, and any state of charge constraint. The voltage constraint can be one of a minimum permissible terminal voltage and a maximum permissible terminal voltage of a cell of the battery. A charging current of the charging phase can be less than a discharge current of the discharging phase. The bi-directional current can be a pulsed current with equal durations of charging and discharging phases. Shuttling energy raises the temperature of the battery to meet power demand.

Figure 13:
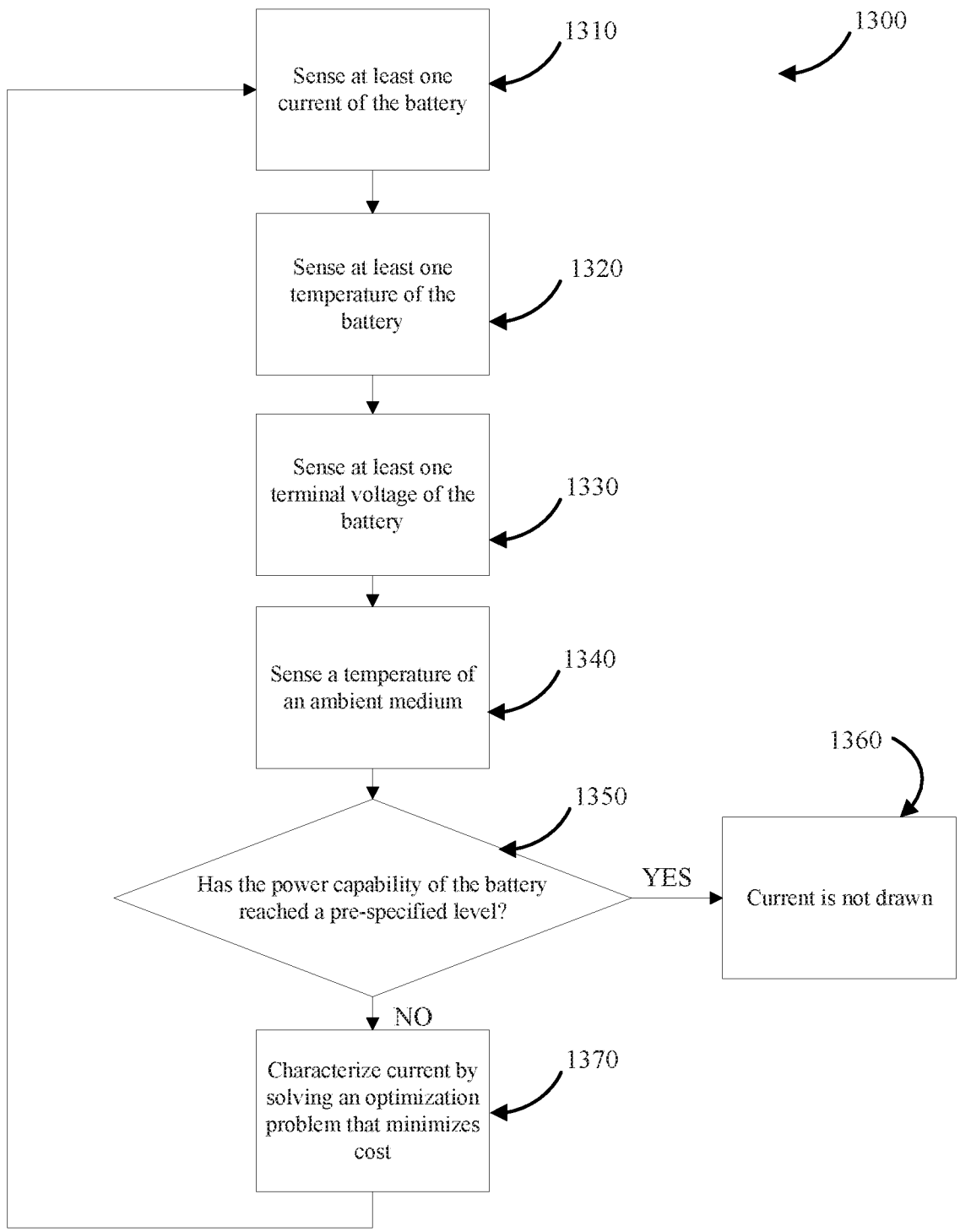
FIG. 13 shows a method for determining current that is drawn from a battery.

In another aspect, the invention of FIG. 13 provides a method 1300 for determining current that is drawn from a battery. The method includes the steps of: sensing at least one current of the battery 1310; sensing at least one temperature of the battery 1320; sensing at least one terminal voltage of the battery 1330; sensing a temperature of an ambient medium 1340, wherein the current is characterized 1370 by solving an optimization problem that minimizes a cost. The optimization problem can comprise one or both of constraints on voltage and current. The voltage constraint can comprise one or both of maximum terminal voltage constraint and minimum terminal voltage constraint. The current constraint can comprise one or both of maximum charging current and maximum discharging current. The cost can be one of: energy removed from the cell during a period of time, and difference between the energy removed from the cell during a period of time and a fraction of the temperature rise of the battery over the same period of time. The cost can be computed over a predicted future time.

In the method of FIG. 13, the current can be a bi-directional pulse train. The current can be a bi-directional pulse, and the period of time can be the period of a pulse train of current. Current can be drawn until the power capability of the battery reaches a pre-specified level 1350. The power capability can be defined as a product of a maximum continuous current that can be drawn over a fixed time interval from the battery without violating any current constraint, any voltage constraint, and any state of charge constraint. The voltage constraint can be one or both of maximum terminal voltage constraint and minimum terminal voltage constraint. The current constraint can be one or both of maximum charging current and maximum discharging current. In the method, the current is drawn until a power demand is met.

EXAMPLES

The following Examples are provided in order to demonstrate and further illustrate certain embodiments and aspects of the present invention and are not to be construed as limiting the scope of the invention.

I. Modeling

This section introduces the models of electrical and thermal dynamics adopted in this study. The dynamic behavior of a cylindrical (26650) lithium ferrophosphate (LFP) cell is captured using simple reduced order models. The validity of the chosen models for the application at hand is ascertained through experimental validation.

A. Electrical Model

Over the decades, much effort has been expended in developing phenomenological models of the electrical dynamics. The more complex models are based on concentration theory, first proposed by Doyle, Fuller and Newman in [reference 8]. Models so derived are hard to parameterize [see reference 9], have notable memory requirements and, are computationally intensive. On the other hand, equivalent circuit models have been widely adopted in literature and in practice; see, for example, [reference 10] and the references therein.

Small signal and local approximations of the dynamic behavior of electrochemical studies can be obtained by using impedance measurements [see reference 11]. Results of the impedance spectroscopy study conducted in [reference 12] suggest that at low operating temperatures, for high frequencies of current, the Li-ion cell's electrical dynamics exhibits a first order characteristic. Thus, in this Example an equivalent circuit model whose dynamics is governed by Eqn. (1), is utilized to capture the electrical dynamics of the Li-ion cell. Note that the system Eqn. (1) describes is one of a Linear Parameter Varying system wherein the parameters are scheduled based on the state of charge (SOC), z, and the cell temperature T.

$$\underbrace{\begin{bmatrix} \dot{z} \\ \dot{V}_1 \end{bmatrix}}_{\dot{x}_{el}} = \underbrace{\begin{bmatrix} 0 & 0 \\ 0 & -\dfrac{1}{R_1(\cdot)C_1(\cdot)} \end{bmatrix}}_{A_{el}} \begin{bmatrix} z \\ V_1 \end{bmatrix} + \underbrace{\begin{bmatrix} -\dfrac{1}{3600 \cdot C_b(T)} \\ -\dfrac{1}{C_1(\cdot)} \end{bmatrix}}_{B_{el}} v_{el}, \quad (1)$$

$$V_t = V_{OCV}(z, T) - V_1 - R_s(\cdot)v_d.$$

where $v_{el}=I$ (sign convention—charge: negative; discharge: positive), $C_b$ is the temperature dependent capacity of the cell; $V_t$ is the terminal voltage of the cell; $V_{ocv}$ is the Open Circuit Voltage (OCV), a function of SOC and cell temperature; and $R_s(.)$ is the series resistance. State $V_1$ can be interpreted as being indicative of the bulk polarization in the cell; its time constant is determined by the pair $\{R_1,C_1\}$ which is assumed to be a function of SOC, cell temperature and current direction. In the interest of notational simplicity, in the remainder of the Example, the dependence of model parameters on dynamic states and input is not explicitly stated when there is little room for confusion.

The power capability of a cell is defined as the product of the maximum continuous current that can be drawn over a fixed time interval without violating current and or voltage constraints. In this disclosure, estimates of power capability for a pulse duration of N samples are computed in discrete-time using expressions provided in [reference 13]. In discrete-time domain, denoting the linearized system matrices of the electrical model as $A_{el}^d$, $B_{el}^d$, $C_{el}^d$, $D_{el}^d$.

$$P_{cap,k} = V_{min}\left\{\dfrac{V_{min} - V_{OCV}(z_k) + C_{el}^d L z_k - C_{el}^d (A_{el}^d)^N x_{el,k}}{C_{el}^d M_{el}^d + D_{el}^d}\right\}, \quad (2)$$

where $V_{min}$ is the minimum permissible terminal voltage, $$L = [1, 0, 0]', \quad M = \sum_{i=0}^{N-1} (A_{el}^d)^i B_{el}^d$$

and N is the number of samples in the constant discharge pulse.

B. Thermal Model

The thermal model of a cylindrical battery developed in [reference 14] is taken to represent the thermal dynamics in this Example. The model of the thermal dynamics when expressed in terms of the core ($T_c$), surface ($T_s$), ambient ($T_{amb}$) temperatures and rate of heat generation (q) is represented as $$\dot{x}_{th} = A_{th}x_{th} + B_{th}v_{th}, \quad (3)$$

$$y_{th} = C_{th}x_{th} + D_{th}v_{th}.$$

$$A_{th} = \begin{bmatrix} \dfrac{-48\alpha h}{r(24k_{th} + rh)} & \dfrac{-15\alpha h}{24k_{th} + rh} \\ \dfrac{-320\alpha h}{r^2(24k_{th} + rh)} & \dfrac{-120\alpha(4k_{th} + rh)}{r^2(24k_{th} + rh)} \end{bmatrix}, \quad (4)$$

$$B_{th} = \begin{bmatrix} \dfrac{\alpha}{k_{th}V_b} & \dfrac{48\alpha h}{r(24k_{th} + rh)} \\ 0 & \dfrac{320\alpha h}{r^2(24k_{th} + rh)} \end{bmatrix},$$

$$C_{th} = \begin{bmatrix} \dfrac{24k_{th} - 3rh}{24k_{th} + rh} & \dfrac{-120rk_{th} + 15r^2h}{8(24k_{th} + rh)} \\ \dfrac{24k_{th}}{24k_{th} + rh} & \dfrac{15rk_{th}}{48k_{th} + 2rh} \end{bmatrix},$$

$$D_{th} = \begin{bmatrix} 0 & \dfrac{4rh}{24k_{th} + rh} \\ 0 & \dfrac{rh}{24k_{th} + rh} \end{bmatrix},$$

where $k_{th}$, h and p are the thermal conductivity, convection coefficient and bulk density, a, the thermal diffusivity is defined as the ratio of $k_{th}$ to the heat capacity, $c_p$. These parameters are assumed to independent of the cell and ambient temperatures.

TABLE I

THERMAL MODEL PARAMETERS

| Parameter | Symbol | Value | Unit |
|---|---|---|---|
| Density | ρ | 2047 | kg/m³ |
| Specific heat coeff. | $c_p$ | 1109 | J/kgK |
| Thermal conductivity | $k_t$ | 0.610 | W/mK |
| Radius | r | 12.9 × 10⁻³ | m |
| Height | L | 65.15 × 10⁻³ | m |
| Volume | $v_b$ | 3.421 × 10⁻⁵ | m3 |

The bulk of heat generation in electrochemical cells can be attributed to three components: Joule, entropic, and heating due to polarization. Since the current in this application is bidirectional and is large in magnitude, Joule heating dominates entropic heating. Further, the heat generated by polarization is affected by the time constant of the R-C pair and the voltage across them.

$$q = \dfrac{V_1^2}{R_1} + I^2 R_s \quad (5)$$

II. Model Parameterization & Validation

The parameters of the thermal model, thermal properties of the cell and the environment, are not significantly influenced by temperature variations. This affords us the option of adopting values presented in [reference 14] (reproduced in Table I) without change. However, a similar argument cannot be made for the electrical model.

Figure 1:
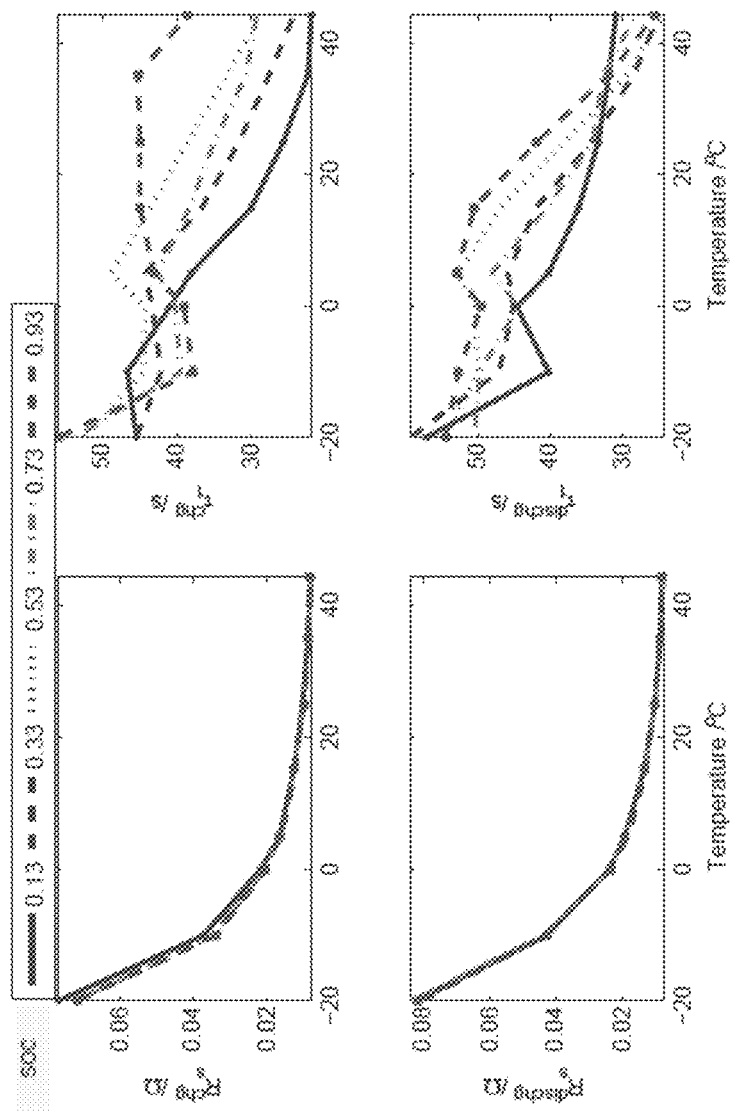
FIG. 1 is a graphical representation of the state of charge (SOC) and temperature dependent parameters at different states of charge (SOCs) during both charge and discharge.

Modeling the electrical dynamics of Li-ion cells as a linear parameter varying system has been extensively pursued in literature; see, for example, [reference 10] and references therein. In this Example, the method described in [reference 10] is extended to sub-zero temperatures to model a 2.3 Ah LFP cylindrical cell. FIG. 1 presents some of the key characteristics of the representative sub-model; each line in every subplot corresponds to the trajectory of the variable as a temperature changes for a particular SOC.

Based on the estimated values for model parameters, for large currents, it can be shown that the heat generated can be approximated by Joule heating. Hence in the remainder of the Example, the generated heat is computed as $$q = I^2 R_s. \quad (6)$$

To validate the models described in the sections afore, a 26650 LFP cell was instrumented with a thermocouple in its center cavity and was excited with square pulses while it rested in a temperature controlled chamber at −20° C. and natural convection conditions (h=5 W/m²K). The pulses in current were set to have a duty-cycle of 50% and the magnitude of charging and discharging currents were set at five and 10 amperes. The frequency of current was set to 1 Hz and measurements of terminal voltage, current, surface and core temperature were collected at the rate of 100 Hz. The measured current was fed to both the electrical (single R-C model) and thermal models and the estimated terminal voltage, surface and core temperatures are plotted in FIG. 3.

Figure 2:
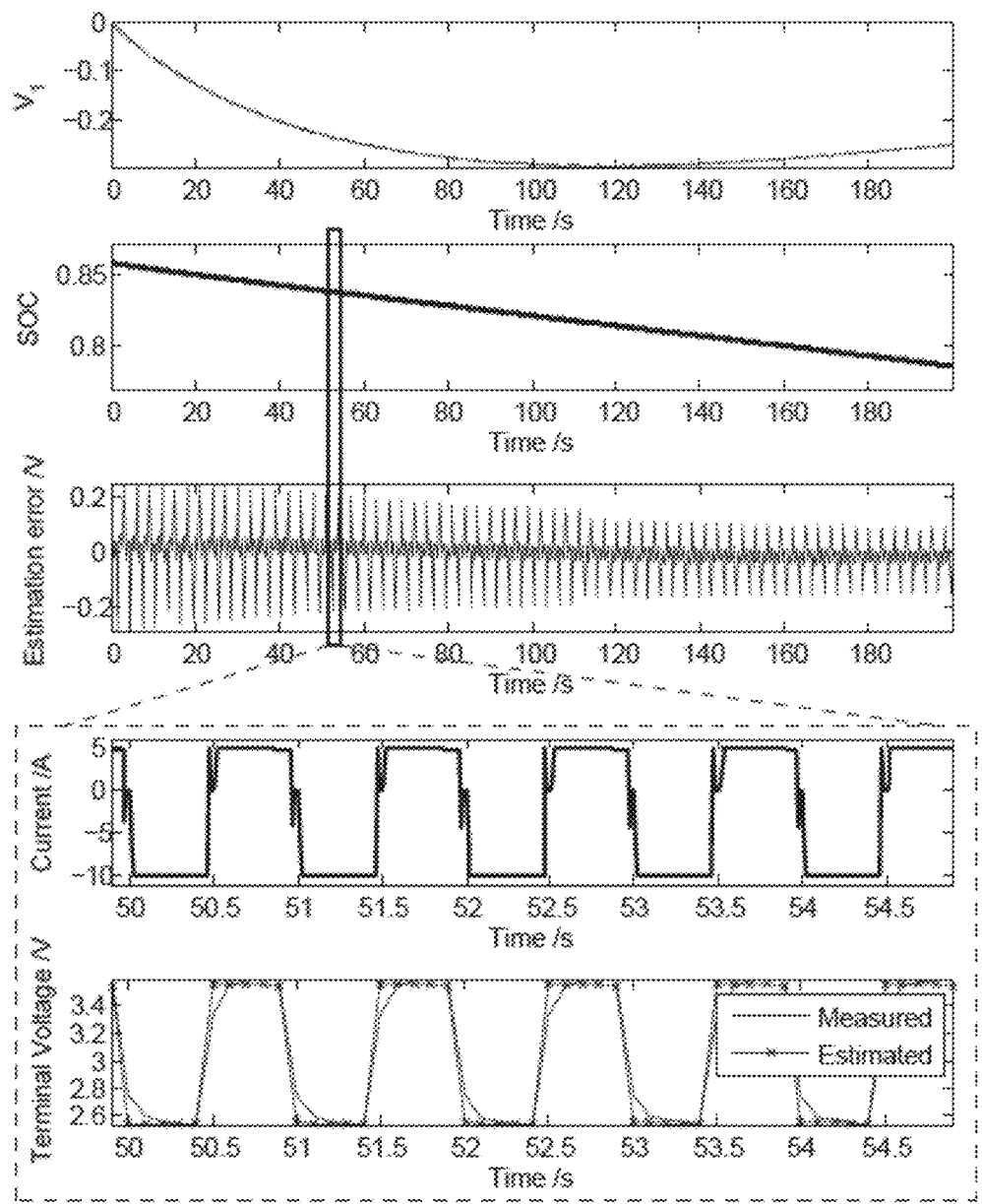
FIG. 2 is a graphical representation of estimated terminal voltages used for model validation.

From FIG. 2, it is noted that the root mean squared (rms) error in estimating the terminal voltage is less than 50 mV. Much of the large errors in estimation of terminal voltage is incident with changes in current direction. The most likely reason is that while the model is able to capture the steady state values, it has deficiencies in fully mimicking the transient response. The reason for the model's inability to capture the transient response is rooted in the parameterization method as the input frequency in this validation profile is about an order faster than the fastest frequency that the developed model can capture. That is to not say however, that the R-C pair in the model is redundant. The first subplot in FIG. 2 traces the trajectory of the estimate of bulk polarization which is shown to be clearly non-zero and significant. For the purposes of this Example, the said model is assumed to be adequate and will be used in the remainder of the Example.

Figure 3:
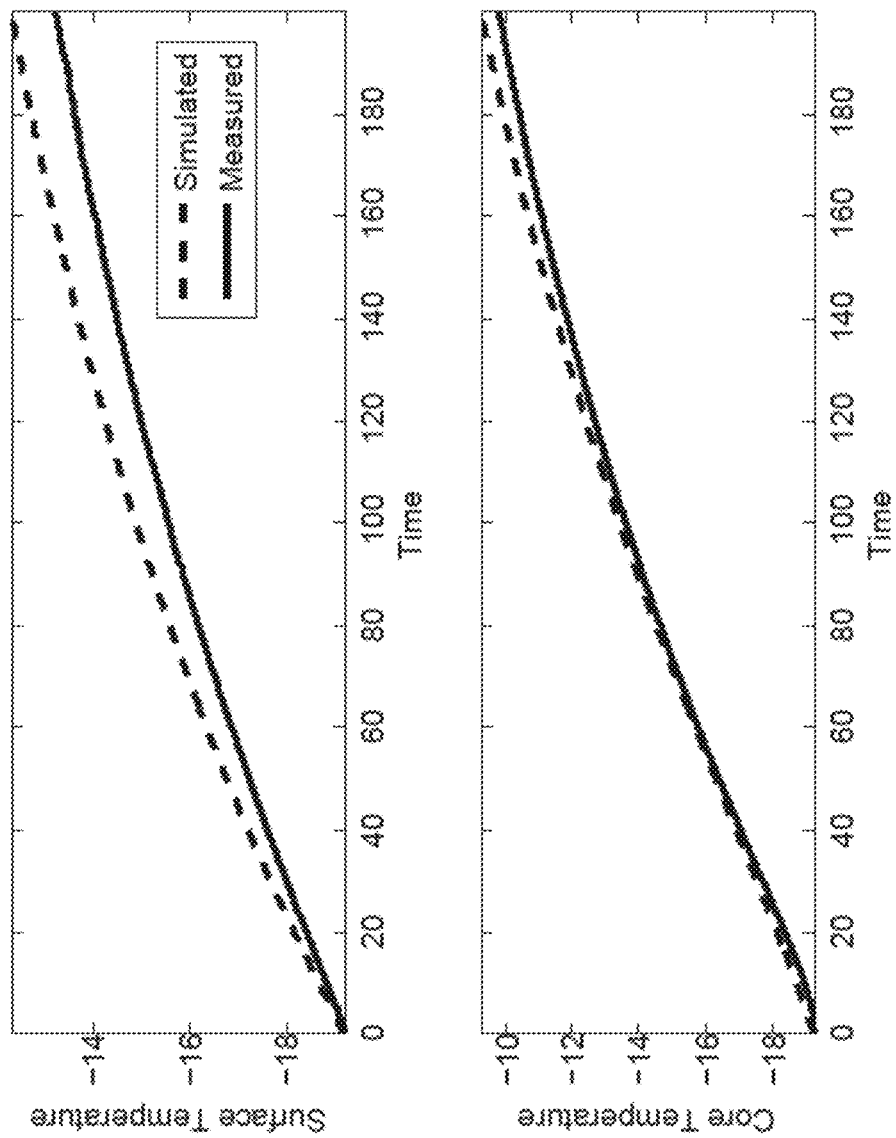
FIG. 3 is a graphical representation of estimated surface temperatures and core temperatures used for model validation.

FIG. 3 presents the outcome of simulating the thermal model. The input to the thermal model, namely Joule heating, was computed using the electrical model parameters and states. Upon inspection, it is possible to conclude that the thermal model is able to predict the surface and core temperatures to within the accuracy of the T-junction thermocouples, 0.5° C., for the critical range of cold conditions.

III. Automated Optimal Warm-Up Formulation

Figure 4:
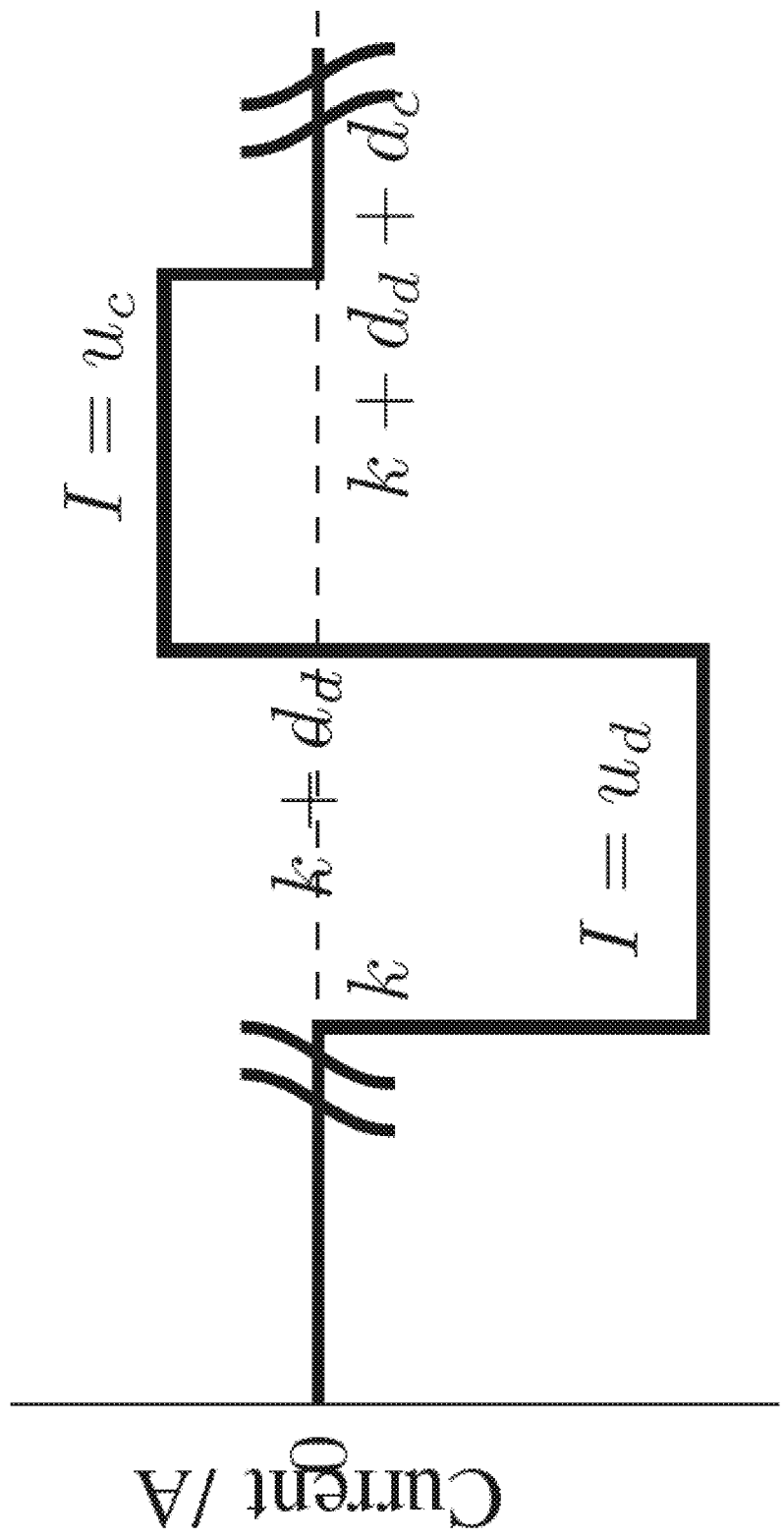
FIG. 4 is a graphical representation of a bi-directionally pulsed input current used to warm a cell.

The primary focus of this Example is on warming the cell in an energy efficient manner until the desired power can be drawn from the cell. To this end, based on electrochemical considerations, the profile of input current is chosen as a sequence of bi-directional pulses recurring at a certain frequency. To keep the problem formulation simple, each period is stipulated to have just one sign change in current as shown in FIG. 4. To completely characterize the current profile, one would require four control variables—frequency, duty-cycle, peaks of charge and discharge pulses. Since the frequency is pre-determined, the values of the remaining variables—duty-cycle and magnitudes, need to be determined.

The dynamic behavior of the electrical and thermal subsystems of the cell are functions of its operating conditions and internal states. Specifically, the optimal decision at the kth instance is influenced by the trajectory of states until then. As the model dynamics is affected by the value of its states, the problem of deciding the values of the control variables is formulated as a linearized receding finite horizon optimization problem and described in this Example section.

The objective of the problem under consideration is to increase the temperature of the cell while penalizing the effective energy discharged (measured in terms of loss in SOC) from the cell. This objective can, in the general case, be mathematically formulated as $$\min_{U,D} -[T_{k+1+n_k \cdot N} - T_{k+1}] + \beta \sum_{j=1}^{N}(u_{e,j} \cdot d_{e,j} + u_{d,j} \cdot d_{d,j}), \quad (7)$$

where N is the number of periods in prediction horizon, β is. the relative penalty on energy loss, $n_s$ is the number of samples. per period of the pulse; in the $j^{th}$ period of the horizon, $d_{e,j}$ and $d_{d,j}$) are the durations of charge and discharge portion of the period as multiples of sampling period $\Delta T$, and $u_{c,j}$ and $u_{d,j}$ are the charge and discharge currents. Then, $$D = \{\{d_{e,j}, d_{d,j}\} | \forall j \in [1,N] \cap \mathbb{Z}, d_{e,j} + d_{d,j} \leq n_s\},$$

$$u = \{\{u_{e,j}, u_{d,j}\} | \forall j \in [1,N] \cap \mathbb{Z}, |u_{e,j}| \leq |u_{d,j}|\}.$$

Note that Eqn. (7) is, by virtue of the fact that the second term is non-convex and that the first and second terms do not have terms in common, non-convex. The variables over which the problem is optimized takes a mixture of integer and continuous values; the problem under consideration is a non-convex Mixed Nonlinear Integer Programming problem (MNIP). Non-convex MNIPs are NP-hard [reference 15] and are not suitable for online control. In the interest of making the problem more tractable, in this Example, the duty-cycle of both charge and discharge pulses are set to be equal, i.e., 50% duty-cycle; in so doing, the problem devolves into a regular nonlinear programming problem (NLP) that could be solved online.

Having fixed the duty-cycle to be 50%, for simplicity of expressions, without loss of generality it is assumed that each period of the current is spread over only two samples. A more general case is easily derived by scaling the appropriate variables.

A. Characterizing the Current Profile

At each instant I, for a prediction horizon of length 2N samples, the problem of deciding the magnitude of pulses to increase cell temperature in an energy conscious manner is computed by solving the following problem P1:

$$\min_{u} - [\overline{T}_{l+2N+1} - \overline{T}_{l+1}] + \overline{\beta}|z_{l+2N+1} - z_{l+1}|$$

s.t.: $\forall k \in \{l+0, \ldots, l+2N\}$ $$\left.\begin{array}{l} x_{th,k+1} = A_{th}^d x_{th,k} + B_{th}^d v_{th,k} \\ y_{th,k} = C_{th}^d x_k + D_{th}^d v_{th,k} \\ v_{th,k} = [u_k^2 R_{s,k} : T_{amb,k}] \end{array}\right\} \quad (8a)$$

$$\left.\begin{array}{l} x_{el,k+1} = A_{el}^d x_{el,k} + B_{el}^d u_k \\ y_{el,k} = C_{el}^d x_{el,k} + D_{el}^d + G_{el}^d \end{array}\right\} \quad (8b)$$

$$\left.\begin{array}{l} |u_i| \leq |I_d(\overline{T}_i)|, \forall i \in \{l+1, l+3, l+ \ldots, 2N-1\} \\ |u_i| \leq |I_c(\overline{T}_i)|, \forall i \in \{l+2, l+4, \ldots, l+2N\} \\ |u_i| \geq |u_{i+1}|, \forall i \in \{l+1, l+3, \ldots, l+2N-1\} \end{array}\right\} \quad (8c)$$

$$\left.\begin{array}{l} V_{t,i} \leq V_{max}, \forall i \in \{l+1, \ldots, l+2N\} \\ -V_{t,i} \leq -V_{min}, \forall i \in \{l+1, \ldots, l+2N\} \end{array}\right\} \quad (8d)$$

$$x_{el,k} = x_{el,l}, x_{th,k} = x_{th,l}$$

where $z_k = \chi_{el,k}(1)$, $T_k = \chi_{th,k}(1)$, $G_{el}^d = V_{oev}(z_{k-1}) C_{el}^d(1) z_{k-1}$, $u = [u_1, \ldots, u_{2N}]'$, and/$\beta$ is a relative weight that penalizes changes in SOC. In the above, the vector of control variables, u, is arranged such that odd and even elements correspond to discharging and charging current magnitudes respectively.

The cost function of P1 strikes a compromise between total increase in the cell's average temperature and penalized loss in state of charge over the entire prediction horizon. Eqns. (8a) and (8b) describe the equality constraints on the temperature and electrical model dynamics in which a superscript 'd' indicates the discrete version of the variable. Cell manufacturers typically specify the voltage operating limit $[V_{min}, V_{max}]$, and the maximum charge and discharge current limits as a function of temperature; Eqns. (8c) and (8d) enforce these voltage and current constraints.

For ease of implementation, the optimal control problem in Eqn. (8) is re-written as an optimization problem by recursive substitution of the dynamics as follows. Expressing the thermal dynamics, in discrete-time as $$x_{th,k+1} = A_{th}^d x_{th,k} + B_{th}^d \begin{bmatrix} q_k \\ T_{amb,k} \end{bmatrix},$$

with $q_k = u_k^2 R_s$, it can be seen that, $$x_{th,k+2N+1} - x_{th,k+1} = [(A_{th}^d)^{2N} - \mathbb{1}_n] x_{th,k+1} + \sum_{j=1}^{2N} (A_{th}^d)^{j-1} B_{th}^d \begin{bmatrix} R_s u_p^2 \\ T_{amb,p} \end{bmatrix}$$

where $p = 2N - j + k + 1$.
Then, $$\overline{T}_{k+2N+1} - \overline{T}_{k+1} = \underbrace{[1 \; 0]}_{\overline{C}}[x_{th,k+2N+1} - x_{th,k+1}], \quad (9)$$

$$= \overline{C}[(A_{th}^d)^{2N} - I] x_{th,k} +$$

$$\overline{C} \sum_{j=1}^{2N} (A_{th}^d)^{j-1} B_{th}^d \begin{bmatrix} R_s u_p^2 \\ T_{amb,p} \end{bmatrix},$$

$$= u' W u + const.,$$

where, defining $\theta_j = \overline{C}(A_{th}^d)^{2N+k-j} B_{th}^d \overline{C}' R_s$. $W = \text{diag}([\theta_1, \ldots, \theta_{2N}])$. The constant term in Eqn. (9) can be expressed as $\overline{C}[(A_{th}^d)^{2N} - 1] \chi_{th,k} + \overline{C} \sum_{j=1}^{2N} (A_{th}^d)^{j-1} B_{th}^d \overline{C} T_{amb,2N-j+k+1}$ where $\overline{C} = [0 \; 1]$. As constant terms in the cost are immaterial to minimization problems, the above constant is dropped in the following expressions.

Since the evolution of SOC is related to the summation of the control variables, the original problem in Eqn. (8) can be re-written in the following form $$\min_{u} -\|u\|_W^2 + \beta \sum_j u_j \quad (10)$$

subject to: $\Psi u \leq Y$ $|u_i| \leq |I_d(T)|, \forall i \in \{1, 2, \ldots, 2N-1\}$ $|u_i| \leq |I_c(T)|, \forall i \in \{2, 4, \ldots, 2N\}$ $|u_i| \geq |u_{i+1}|, \forall i \in \{1, 3, \ldots, 2N-1\}$ where $\Psi$ and Y are as defined in Eqns. (11) and (12).

$$\Psi = \begin{bmatrix} -D_{el}^d & 0 & 0 & \ldots & 0 \\ C_{el}^d B_{el}^d & D_{el}^d & 0 & \ldots & 0 \\ -C_{el}^d A_{el}^d B_{el}^d & -C_{el}^d B_{el}^d & -D_{el}^d & \ldots & 0 \\ \vdots & \vdots & \vdots & \ddots & \vdots \\ C_{el}^d (A_{el}^d)^{2N-2} B_{el}^d & C_{el}^d (A_{el}^d)^{2N-3} B_{el}^d & C_{el}^d (A_{el}^d)^{2N-d} B_{el}^d & \ldots & D_{el}^d \end{bmatrix} \quad (11)$$

$$Y = \begin{bmatrix} -V_{min} \\ V_{max} \\ -V_{min} \\ \vdots \\ V_{max} \end{bmatrix} - \begin{bmatrix} -C_{el}^d A_{el}^d \\ C_{el}^d (A_{el}^d)^2 \\ -C_{el}^d (A_{el}^d)^3 \\ \vdots \\ C_{el}^d (A_{el}^d)^{2N} \end{bmatrix} x_k - \begin{bmatrix} -C_{el}^d B_{el}^d \\ C^d A^d B_{el}^d \\ -C_{el}^d (A_{el}^d)^2 B_{el}^d \\ \vdots \\ C_{el}^d (A_{el}^d)^{2N-1} B_{el}^d \end{bmatrix} u_k - \begin{bmatrix} -(V_{ocu}(z_k) - C_{el}^d(1) z_k) \\ V_{ocu}(z_k) - C_{el}^d(1) z_k \\ -(V_{ocu}(z_k) - C_{el}^d(1) z_k) \\ \vdots \\ V_{ocu}(z_k) - C_{el}^d(1) z_k \end{bmatrix} \quad (12)$$

$W = \text{diag}([\vartheta_1, \ldots, \vartheta_{2N}])$, $\vartheta_i > 0$, $\theta_i$ are functions of thermal system matrices.

The above optimization problem belongs to the class of problems where a concave function is minimized over a convex set; such problems have been studied extensively in literature. Solvers of concave optimization problems can be broadly classified as being either approximate or global; global methods generally employ cutting-plane and or branch and bound techniques [references 16, 17]. In general global solvers are computationally expensive and thus their use may be limited to small-scale problems.

Figure 5:
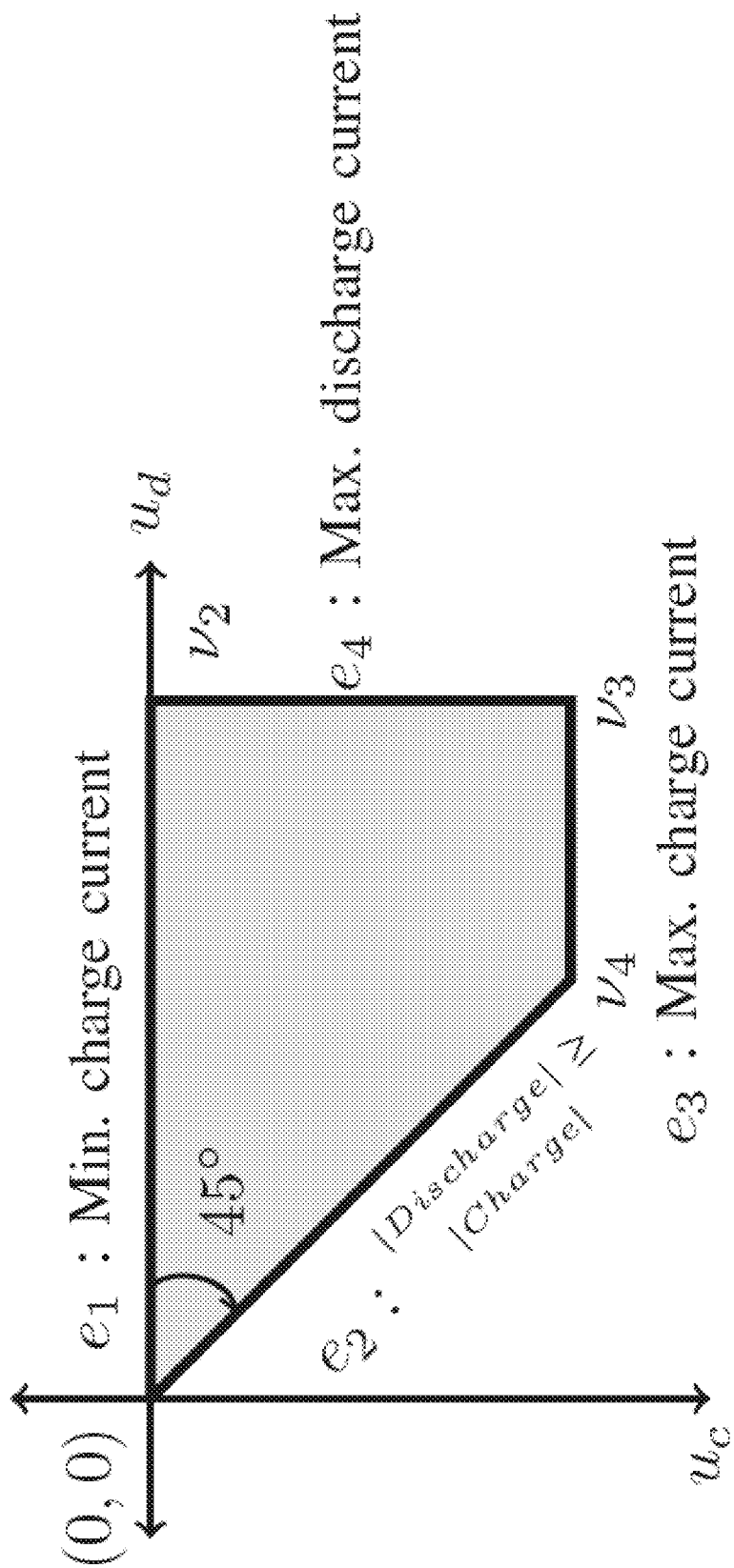
FIG. 5 is a graphical representation detailing a region of a constrained optimization problem when the prediction horizon has a length of one.

To gain better insight into the nature of the optimization problem under investigation, consider the simple case when the prediction horizon is of length one. FIG. 5 presents the characteristic shape of the constraint polytope in $R^2$ wherein coordinates of the vertices represent, in sequence, the magnitude of discharge and charge pulses. While edge el enforces the trivial condition that charging and discharging pulses cannot have the same polarity, edge ea ensures that the magnitude of the charge current is never greater than that of the discharge current. Edges $e_3$ and $e_4$ complete the polytope and enforce adherence to voltage and current constraints.

The bounded polytope defined by constraints in the problem under consideration is convex. The solution to concave minimization problems, when restricted to a convex polytope lies, at one of the vertices of the polytope [reference 18]. For the simple case depicted in FIG. 5, it can be shown that the solution lies at either $v_3$ or $V_4$. As this Example is a study in a simulation framework, the concave minimization problem is solved using a vertex enumeration strategy to find the global minimizer.

B. Control Scheme

In the preceding sub-section, the problem of determining the magnitude of input current of the cell was formulated as an optimization problem in a receding horizon framework. Incorporating the termination condition based on power capability,

---

Algorithm 1: Control Algorithm (open-loop)

---

```
set flag = 0;
set [u_d, u_c]' = [-1, 1]';
set number_of_samples_in_block;
while !flag do
 |   Compute P_cap;
 |   if P_cap <= P_dmd then
 |   |   Solve optimization problem;
 |   |   set [u_d, u_c]' = [-u_d*, u_c*]';
 |   |   wait(t_s · number_of_samples_in_block) seconds
 |   else
 |   |   set flag=1;
 |   end
end
```

---

† Variables with an '*' superscript are optimal solutions.

the overall process can be cast into the control scheme depicted in Algorithm 1.

Figure 6:
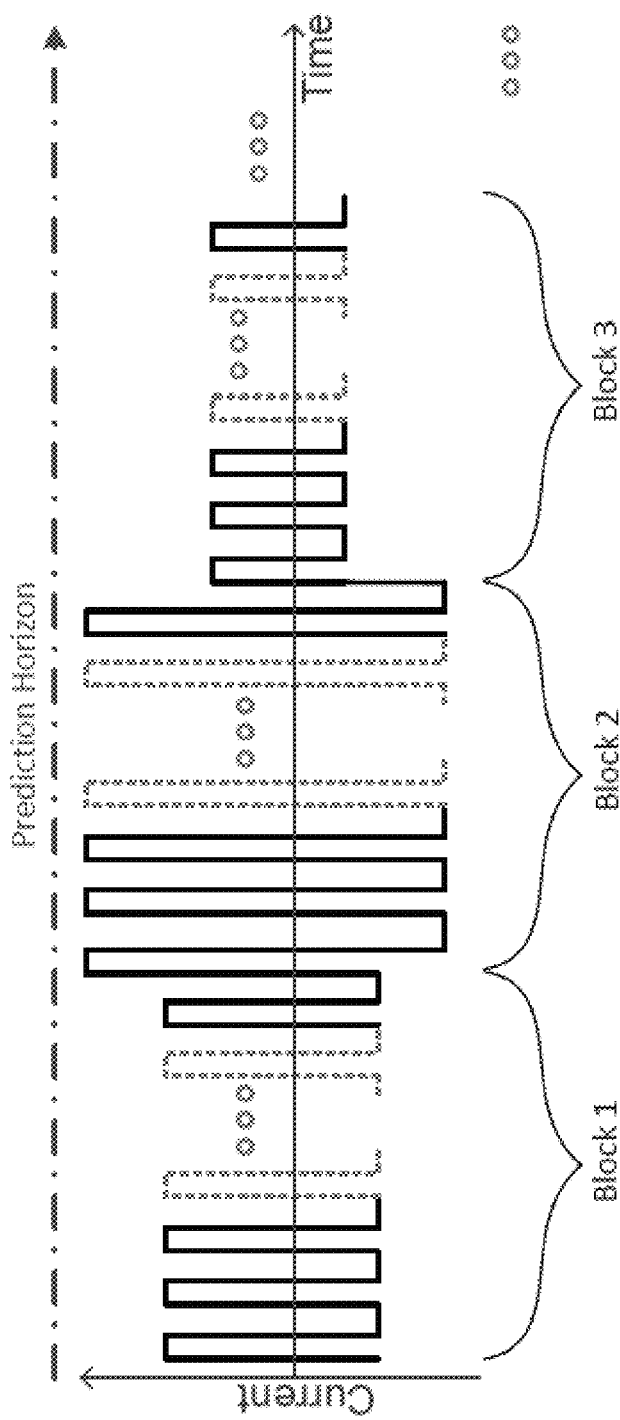
FIG. 6 is a graphical representation detailing a blockwise determination of the magnitude of a cell input current.

The time constant of the thermal dynamics of the cell under consideration is in the order of tens of minutes. Thus, the increase in temperature as a result of applying one period of current (at 10 Hz) may not be significant. For this reason, the problem of current magnitude determination is solved in blocks. Periods in the prediction horizon are binned into blocks, with each block consisting of a pre-set number of pulse periods; the prediction horizon is then described by the number of blocks (refer FIG. 6). The optimization problem as formulated earlier is modified to enforce the constraint that every period in each block is identical.

In the overall scheme, at each control instant, the power capability, $P_{cap}$, is first estimated and compared to the desired set-point, $P_{dmd}$. If the required power cannot be provided, the optimization problem to compute the magnitudes of the pulses is solved and the optimal solution to the first block is applied. After waiting a duration that is equal to the duration of the block, the process is repeated and the power capability is re-computed. Once the desired power can be delivered, the warm-up operation is terminated.

Operation of this kind can be interpreted as intentionally allowing the states of the thermal model to grow. The thermal dynamics of a Li-ion cell is inherently stable, unless the temperature is increased to levels that may trigger thermal run-away. It can be argued that given the coupling between the thermal and electrical sub-models, as long as the maximum temperature is bounded away from (from above) a critical temperature ($\approx 80°$ C.), the thermal model remains stable and controllable. As for the electrical dynamics, SOC is a constrained state and the value of $V_1$ is implicitly bounded as a function of constraints on the terminal voltage and input current.

IV. Simulation and Discussion

In this section, the proposed Pulsed Current Method (PCM) is simulated with both the plant and model dynamics dictated by the equations in previous sections of the Example.

A. Simulation Setup

The augmented electro-thermal model (Eqn. (13)) is nonlinear in input and output; the proposed algorithm is implemented using discrete local linear models and is simulated in the MATLAB/Simulink environment using a custom vertex enumerator.

$$\begin{bmatrix} \dot{x}_{el} \\ \dot{x}_{th} \end{bmatrix} = \begin{bmatrix} A_{el}x_{el} \\ A_{th}x_{th} \end{bmatrix} + \begin{bmatrix} B_{el} & 0 \\ 0 & B_{th} \end{bmatrix} \begin{bmatrix} u \\ u^2 \\ T_{amb} \end{bmatrix} \quad (13)$$

$$V_t = V_{OCV}(x_{el}) + C_{el}x_{el} + D_{el}u,$$

where u is the current drawn from the cell.

In implementing PCM, variable values were chosen as follows—the cell operating voltage bounds were set at [2,3.6]; the frequency of the pulse train was set to 10 Hz based on electrochemical considerations [reference 12] and the model was simulated at Nyquist frequency. The energy that is removed from the cell is assumed to be stored in an external storage system such as an ultracapacitor bank.

The simulated LFP cell is assumed to be a part of a pack that consists of 60 cells in series and four cells in parallel with a rated nominal continuous power at 25° C. of 45 kW. Limits on the maximum deliverable current were set by factoring in manufacturers specifications (Table II) and the standards proposed by USABC [reference 19]. Note that the specifications provided in Table II are for continuous discharge. For pulsed currents, a multiplicative factor of 1.5 is used to amplify the current ratings for constant operation. In addition, we assume a Arrhenius relation of increase in charge current limit above 0° C.

TABLE II

MANUFACTURER'S SPECIFICATIONS FOR A123 26650 CELLS

| Direction | Temperature | Continuous Current |
|---|---|---|
| Charge | 0-20° C. | 3 A |
| Charge | 20-50° C. | 10 A |
| Discharge | −30-60° C. | 60 A |

The control scheme proposed in the previous section relies on a receding horizon controller. In receding horizon controllers, the length of the prediction horizon is a tuning parameter that takes integer values. However, for large problems and problem with fast dynamics, shorter control and prediction horizons are preferred; in [reference 20], the authors provide necessary conditions for when the prediction horizon of length one is near optimal. In this section, unless stated otherwise, it assumed that the prediction and control lengths are of length one; the impact of this assumption is studied numerically in the section below.

B. Simulation, Results & Discussion

This section documents result of simulating the electro-thermal model of the battery developed in the sections I and II above using the algorithm described in Section III. Simulations are run with the following parameters: $SOC_0=0.6$, ambient temperature set to $-20°$ C. and under natural cooling condition ($h=5W/m^2K$).

Baseline

To study the performance of the proposed method and to establish a baseline, we compare the trajectories of battery temperature, power capability and SOC from the following two cases: (1) the limiting case when $\beta=0$, and (2) the case of maximum permissible continuous discharge. The second case, when the maximum permissible continuous discharging current is drawn, generates the maximum possible heat at every sample and hence is an approximate solution to the minimum warm-up time problem. In this mode of operation, to satisfy constraints, the terminal voltage is held at $V_{min}$ (that is as long as the discharge current constraint is satisfied); thus, this mode is labeled Constant Voltage Method (CVM).

Figure 7:
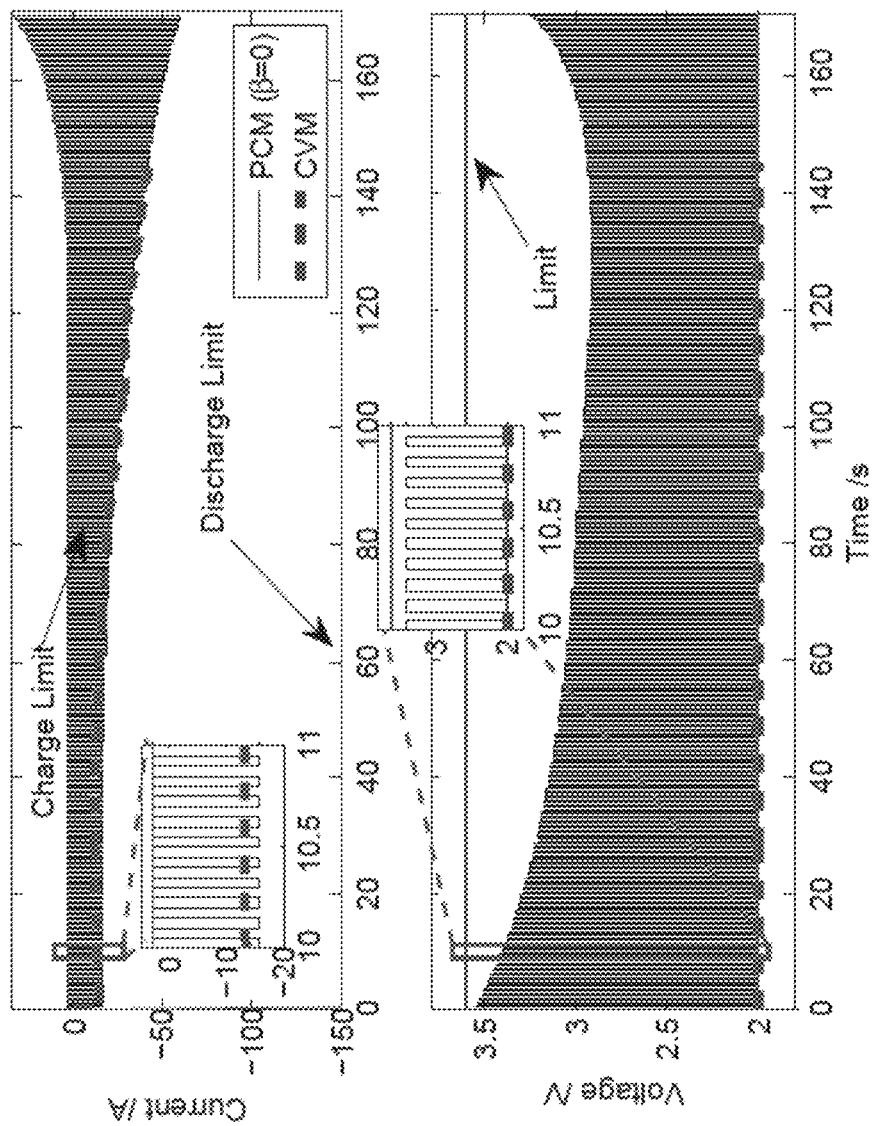
FIG. 7 is a graphical representation of down-sampled simulated trajectory of voltage and current using Pulse Current Method.
Figure 8:
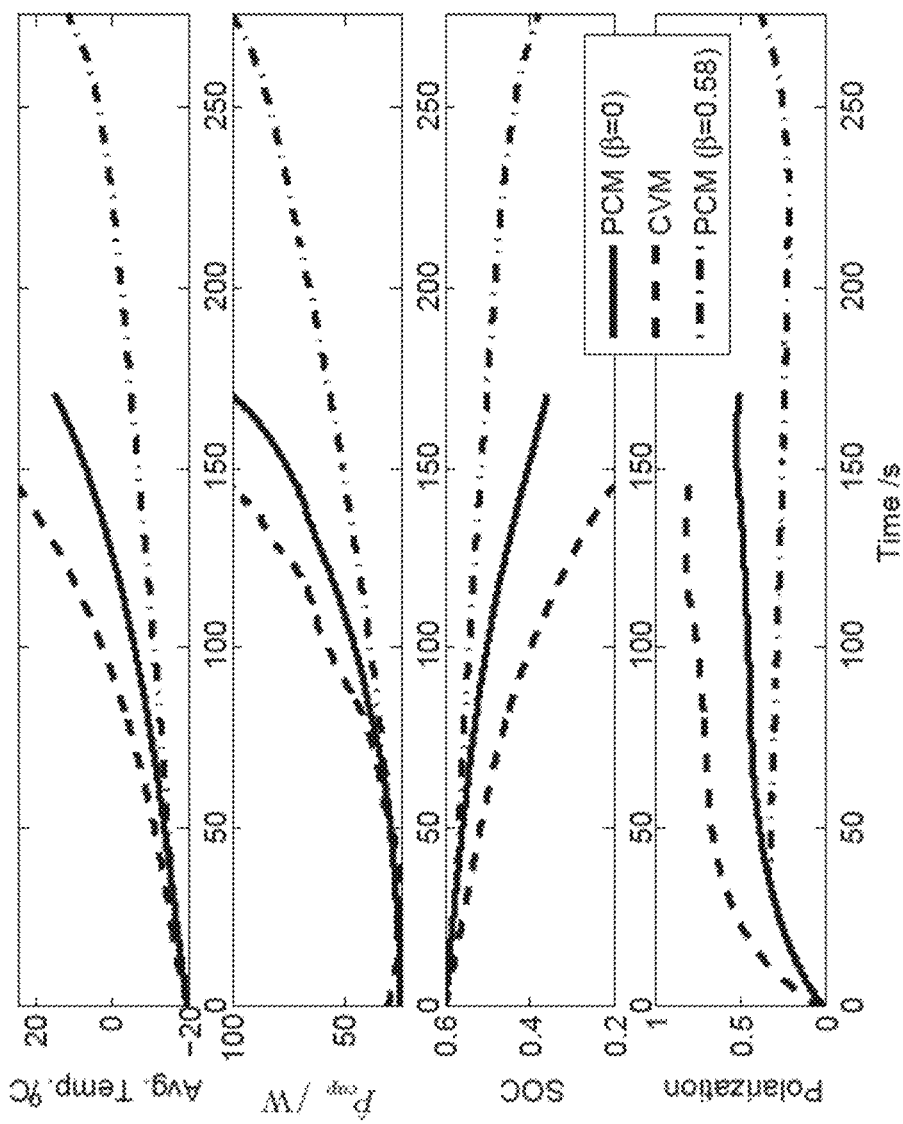
FIG. 8 is a graphical representation of simulated trajectories of average temperature, power capability, and polarization using Pulse Current Method and Constant Voltage Method.

FIGS. 7 and 8 present trajectories resulting from simulating the electro-thermal model using the proposed reference current generation algorithm, PCM, and CVM using power demand, ($P_{dmd}=100$ W) as terminal constraint. Table III tabulates some of the key indices from having applied CVM and PCM.

TABLE III

COMPARISON BETWEEN PCM* AND CVM, KEY INDICES

| Method | Oper. Time | $SOC_{store}$ | $T_{final}$ | $SOC_{loss}$ |
|---|---|---|---|---|
| PCM ($\beta = 0$) | 172 s | 0.13 | 17.5° C. | 0.11 |
| PCM ($\beta = 0.58$) | 278 s | 0.12 | 12.25° C. | 0.10 |
| CVM | 143 s | 0.23 | 24.3° C. | 0.15 |

*1 block with 5 periods

The value of penalty on SOC lost in each period, $\beta$, influences the duration of the warm-up operation. Larger penalties will tend to increase the duration of the warm-up phase; this follows by observing that when operating from sub-zero temperatures, the current limits are not symmetric. That is, the minimum warm-up time that can be achieved using PCM is when $\beta=0$. From FIG. 7 and Table III, it is noted that the warm-up time when using CVM is shorter than when using PCM with $\beta=0$. Thus, the warm-up time using PCM, for any value of $\beta$, will be longer than when using CVM.

Energy storage elements such as ultra-capacitors do not have very high energy densities, i.e., it is desirable to transfer as little energy as possible to the external energy storage element. From Table III, note that the equivalent SOC stored in external storage using CVM is almost twice that of PCM.

Lastly, in comparing the effective energy lost using both methods—PCM and CVM—it is noted that CVM is more lossy. More specifically, comparing the CVM with PCM ($\beta=0$), we observe that the total energy lost increases by nearly 35%; this increased loss manifests itself as increased terminal temperature of the cell.

The above results bear evidence to the fact that terminating warm-up based on terminal temperature is not the same as when using power as terminal constraint. While CVM enjoys shorter operating times, it is more lossy and requires larger storage elements as compared to PCM.

Penalizing Energy Loss

Figure 9:
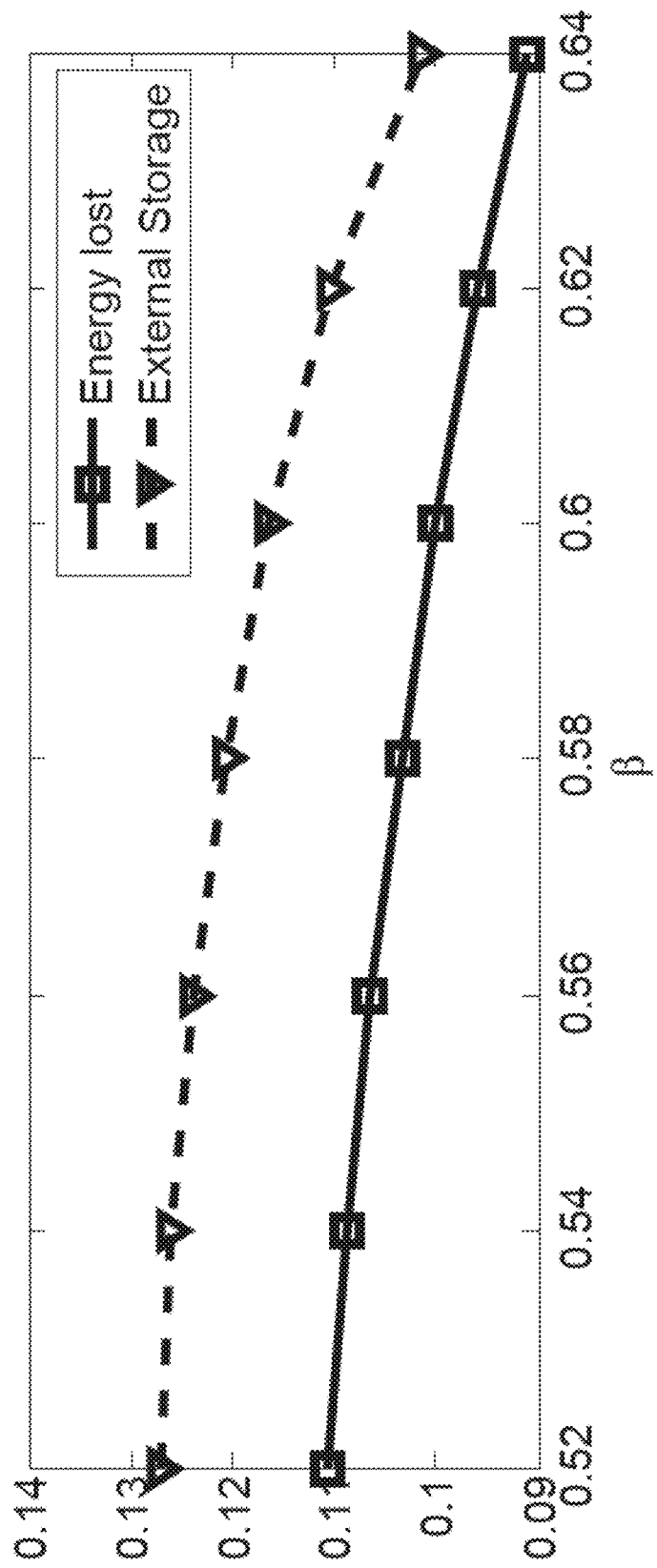
FIG. 9 is a graphical representation of increasing penalty on energy loss shown as percent change with respect to when no penalty is applied.
Figure 10:
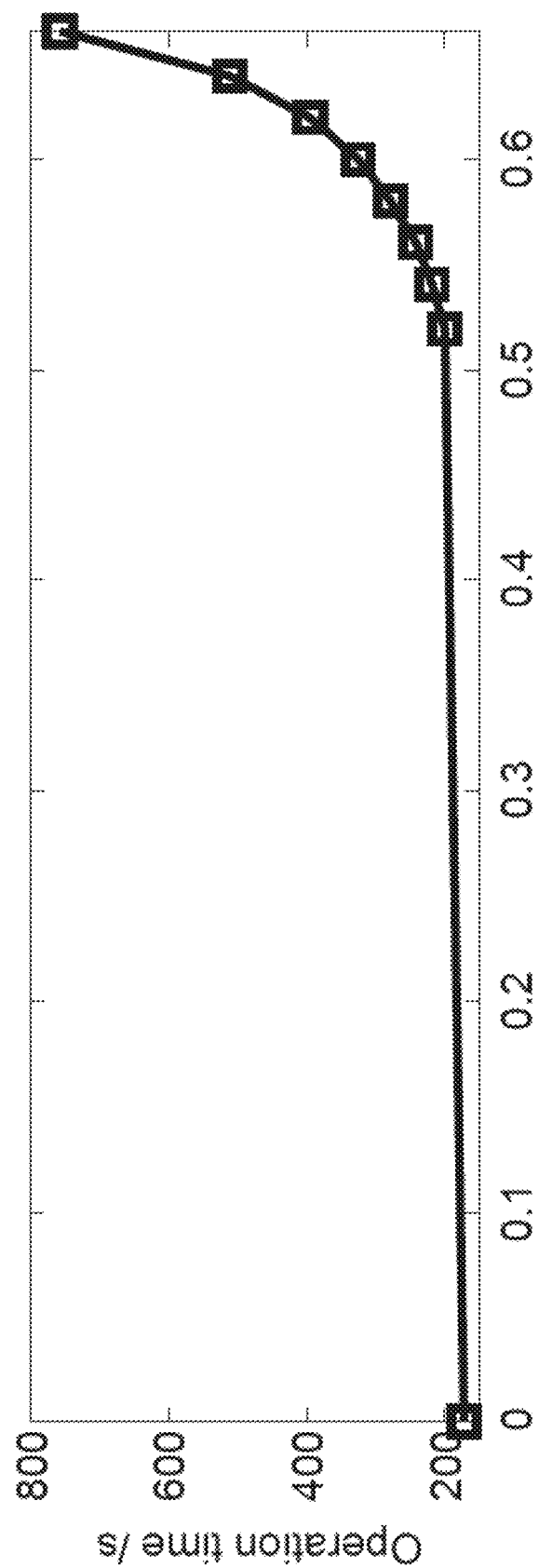
FIG. 10 is a graphical representation of a comparison between increased efficiency and warm-up operation time.

As formulated, the value of penalty $\beta$ in the cost can be used to regulate the amount of energy dissipated as heat. FIG. 9 documents the total energy lost and the reduction in size of external storage elements in equivalent battery SOC, for different values of $\beta$. Inspecting FIG. 9, it is evident that increasing the value of $\beta$ can reduce energy expenditure and external sizing. By computing the percent change with respect to when $\beta=0$, the energy lost and external storage size can be reduced by as much as 20%. This increased efficiency of operation does however come at the expense of operation time. FIG. 10 presents a comparison between the increase in warm-up efficiency and time taken to be able to deliver the desired power; increased energy efficiencies result in increasing warm-up times.

Figure 11:
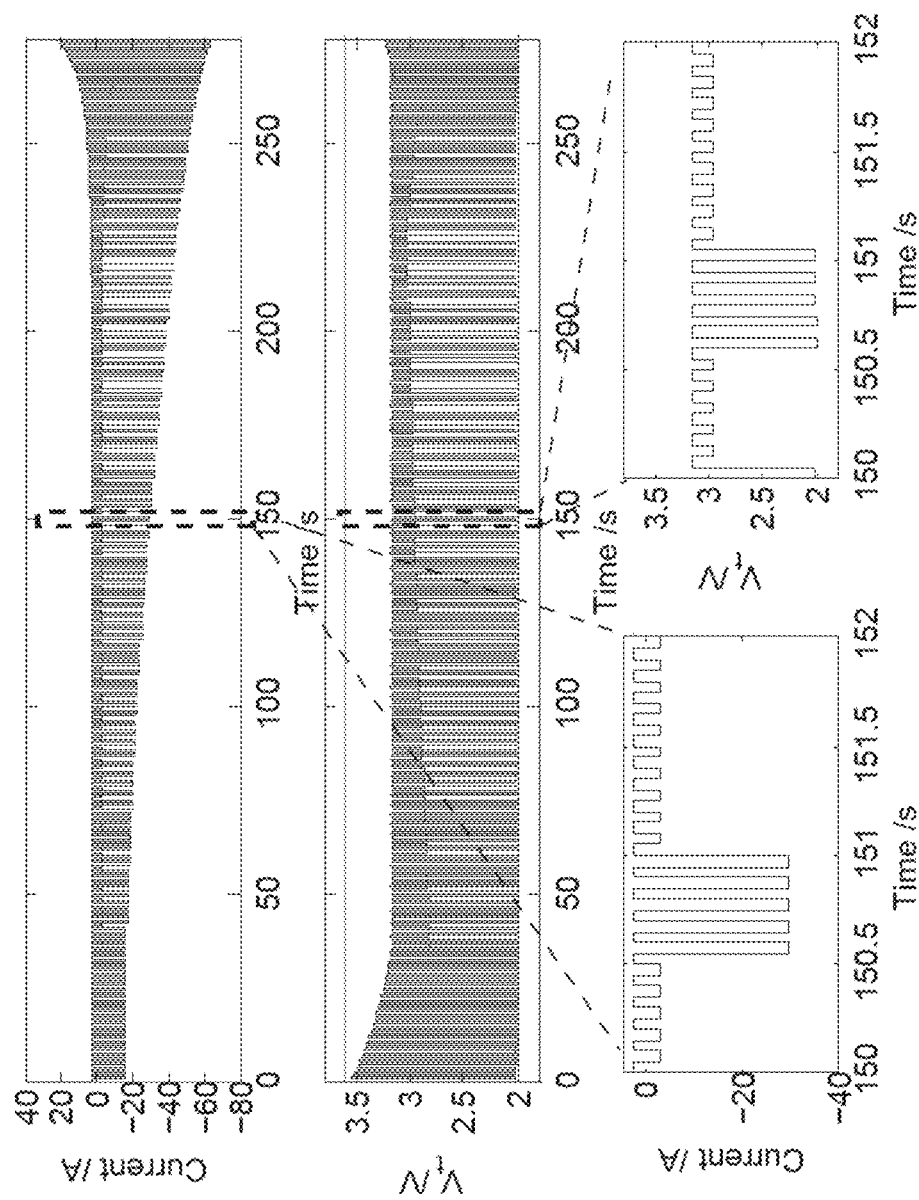
FIG. 11 is a graphical representation showing a simulated trajectory of voltage, polarization, and current using Pulse Current Method.

The observations from FIGS. 9 and 10 can be explained by studying the trajectories of terminal and polarization voltages, when $\beta=0$ and $\beta=0.58$; FIGS. 8 and 11 depict these trajectories. The first observation from comparing these figures is that unlike the case when $\beta=0$, the trajectory of terminal voltage when $\beta=0.58$, does not always hit the lower limit of 2V; however, it does on occasion. Further, the trajectory of polarization is different after 40 seconds; these observations can be interpreted as follows.

From the problem formulation in Eqn. (10), it is possible to show that the value of polarization and the cell's operating temperature result in the solution migrating between vertices of the constraint polytope (as an example cf. FIG. 5 and vertices $v_3$ and $v_4$). The vertices between which the solution switches are dictated by the temperature of the cell, penalty $\beta$ and the polarization. As the penalty $\beta$ increases, SOC lost over the control horizon becomes important; therefore, the optimal solution tends to be $u_d=u_c$, i.e. the amplitudes of current during charge and discharge are the same, which can be clearly observed in FIG. 11 when $\beta=0.58$ compared to the case of $\beta=0$ in FIG. 9. The preference of charging and discharging at the same current rate has two consequences:
(1) the average current during the control horizon decreases to zero and hence polarization voltage drops as well;
(2) the heat generated during each period reduces and correspondingly the increasing rate of temperature diminishes.

As seen from FIG. 8, the increasing rate of temperature becomes lower when $\beta=0.58$ than when no penalty on SOC loss is imposed. It is also observed that polarization voltage decreases from 50 seconds to 230 seconds. The polarization state is inherently stable; as the average current during each block in the control horizon tends to zero, the value of polarization decreases. The reduced polarization and rate of heat generation may result in the solution switching back to the vertex that extracts maximum current from the cell (vertex $v_3$ in FIG. 5). This results in the switching behavior observed in FIG. 11.

FIG. 10 also highlights another important characteristic of the solution—as the value of $\beta$ is increased, the operation time reaches an asymptote, i.e., it becomes impossible to reach the desired terminal power capability. This is an extension of the behavior described above wherein the solution migrates; as p increases, the solution migrates and remains at the vertex that favors charging and discharging currents being of the same magnitude (vertex $v_4$ in FIG. 5). In addition, for βs sufficiently large, the solution will remain at the vertex that favors negligible SOC loss and hence the power demand can never be achieved. Thus, for the above algorithm to be implemented, the value of β needs to be chosen appropriately to ensure feasibility of overall problem. (It may be possible to, using models, build a map indexed by initial SOC and temperature to provide bounds on the value of β).

Effect of Longer Prediction Horizons

In simulating the results presented thus far, the prediction horizon was set to be a single block consisting of five pulses. In the context of predictive control, longer prediction horizons are known to produce better approximations of the global optimal solution. In this application, owing to the linearized MPC implementation, the prediction horizon cannot be taken to be arbitrarily large without incurring errors resulting from model linearization.

To investigate the influence of prediction horizon on the optimal solution trajectory, an iterative test was performed wherein the length of the prediction horizon was increased incrementally; results of which are presented in Table IV. The other parameters of the simulation were: $P_{dmd}$=50W, h=5W/m²K, and β=0.57 (the power demand is set at 50 W in the interest of computational time).

The data presented in Table IV, as expected, indicates that given the same penalty on loss in energy, increasing the length of the prediction horizon decreases the total energy lost; this however does come at the expense of computational time. In fact, there appears to be a quadratic relation between decrease in loss and total operation-time. Comparing the effective increase in savings and the increase in computational and operation time, a case for the use of prediction horizon of length one block can be made.

TABLE IV

Comparing The Impact Of Prediction Horizon Based On Key Indices*

| | Prediction Length | | |
|---|---|---|---|
| Index | 1 | 2 | 3 |
| $SOC_{loss}$ | 1 | 0.99 | 0.98 |
| External Storage | 1 | 0.99 | 0.97 |
| Terminal Time | 1 | 1.01 | 1.03 |
| Computational Time | 1 | 35 | 107 |

*Entries normalized wrt. results when prediction length is one block

CONCLUSION

In this disclosure, a Li-ion battery warm-up strategy that increases the cell temperature to meet power demand in an energy efficient method is described. The shape of current drawn from the cell was set to be bi-directional pulses to minimize polarization and reduce damage to electrodes. Magnitude of the pulses were determined by solving a constrained optimization problem. From simulations based on models of a 26650 LFP cell, it is noted that it is possible to reduce energy lost as heat and the size of external storage, by as much as 20%.

REFERENCES

[1] H. Rahimi-Eichi, U. Ojha, F. Baronti, and M. Chow, "Battery management system: An overview of its application in the smart grid and electric vehicles," *Industrial Electronics Magazine, IEEE*, vol. 7, pp. 4-16, June 2013.

[2] S. Mohan, Y. Kim, A. Stefanopoulou, and Y. Ding, "On the warmup of Li-ion cells from sub-zero temperatures," in *American Control Conference (ACC)*, 2014, pp. 1547-1552, June 2014.

[3] Y. Ji, Y. Zhang, and C.-Y. Wang, "Li-ion cell operation at low temperatures," *Journal of The Electrochemical Society*, vol. 160(4), pp. 636-649, 2013.

[4] Y. Ji and C. Y. Wang, "Heating strategies for Li-ion batteries operated from subzero temperatures," *Electrochimica Acta*, vol. 107, pp. 664-674, 2013.

[5] Y.-H. Liu and Y.-F. Luo, "Search for an optimal rapid-charging pattern for Li-ion batteries using the Taguchi approach," *Industrial Electronics, IEEE Transactions on*, vol. 57, pp. 3963-3971, December 2010.

[6] J. Jiang, Q. Liu, C. Zhang, and W. Zhang, "Evaluation of acceptable charging current of power Li-ion batteries based on polarization characteristics," *Industrial Electronics, IEEE Transactions on*, vol. 61, pp. 6844-6851, December 2014.

[7] F. Savoye, P. Venet, M. Millet, and J. Groot, "Impact of periodic current pulses on Li-ion battery performance," *Industrial Electronics, IEEE Transactions on*, vol. 59, pp. 3481-3488, September 2012.

[8] M. Doyle, T. F. Fuller, and J. Newman, "Modeling of galvanostatic charge and discharge of the lithium/polymer/insertion cell," *Journal of Electrochemical Society*, vol. 140(6), pp. 1526-1533, 1993.

[9] A. P. Schmidt, M. Bitzer, rpd W. Imre, and L. Guzzella, "Experiment driven electrochemical modeling and systematic parameterization for a lithium-ion battery cell," *Journal of Power Sources*, vol. 195, no. 15, pp. 5071-5080, 2010.

[10] X. Lin, H. E. Perez, S. Mohan, J. B. Siegel, A. G. Stefanopoulou, Y. Ding, and M. P. Castanier, "A lumped-parameter electro-thermal model for cylindrical batteries," *Journal of Power Sources*, vol. 257, no. 0, pp. 1-11, 2014.0

[11] W. Huang and J. Qahouq, "An online battery impedance measurement method using dc-dc power converter control," Industrial Electronics, IEEE Transactions on, vol. 61, pp. 5987-5995, November 2014.

[12] S. Tippmann, D. Walper, L. Balboa, B. Spier, and W. G. Bessler, "Low temperature charging of lithium-ion cells part I: Electrochemical modeling and experimental investigation of degradation behavior," *Journal of Power Sources*, vol. 252, pp. 305-316, 2014.

[13] X. Hu, R. Xiong, and B. Egardt, "Model-based dynamic power assessment of lithium-ion batteries considering different operating conditions," *Industrial Informatics, IEEE Transactions on*, vol. 10, pp. 1948-1959, August 2014.

[14] Y. Kim, S. Mohan, J. Siegel, A. Stefanopoulou, and Y. Ding, "The estimation of temperature distribution in cylindrical battery cells under unknown cooling conditions," *Control Systems Technology, IEEE Transactions on*, vol. PP, no. To appear, pp. 1-1, 2014.

[15] S. Burer and A. N. Letchford, "Non-convex mixed-integer nonlinear programming: A survey," *Surveys in Operations Research and Management Science*, vol. 17, no. 2, pp. 97-106, 2012.

[16] R. Horst, "On the global minimization of concave functions," *Operations Research-Spektrum*, vol. 6, no. 4, pp. 195-205, 1984.

[17] H. P. Benson and R. Horst, "A branch and bound-outer approximation algorithm for concave minimization over a convex set," *Computers & Mathematics with Applications*, vol. 21, no. 67, pp. 67-76, 1991.
[18] R. T. Rockafellar, *Convex analysis*, vol. 28. Princeton university press, 1997.
[19] The Idaho National Laboratory, *Battery Test Manual For Plug-In Hybrid Electric Vehicles*. U.S. Department of Energy Vehicle Technologies Program, 2 ed., December 2010.
[20] C. Muller, D. E. Quevedo, and G. C. Goodwin, "How good is quantized model predictive control with horizon one?," *Automatic Control, IEEE Transactions on*, vol. 56, no. 11, pp. 2623-2638, 2011.

The citation of any document or reference is not to be construed as an admission that it is prior art with respect to the present invention.

Thus, the invention provides an automated system for warming-up a battery, such as a lithium-ion battery pack, when operating from sub-zero temperatures making use of an algorithm that trades-off between warm-up time and associated loss of energy. The procedure can use an auxiliary storage element like an ultra-capacitor bank or other battery. Energy is shuttled between the battery and the auxiliary storage element to warm-up the battery and the magnitude of the current is computed by solving real-time predictive optimization problems that utilize a model of electrical and thermal cell dynamics. The algorithm allows the user to input desired departure time and minimizes the total energy dissipation by auto-starting the warm-up process at the appropriate time.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A method for determining current that is drawn from a battery in a vehicle, the method comprising: sensing at least one current of the battery; sensing at least one temperature of the battery; sensing at least one terminal voltage of the battery; sensing a temperature of an ambient medium; and shuttling current between the battery and an electrical storage element thereby defining a charging phase from the electrical storage element to the battery and a discharging phase from the battery to the electrical storage element, wherein the current that is drawn from the battery in the discharging phase is determined by solving an optimization problem that minimizes a cost selected from one of: (i) energy removed from a cell during a period of time, and (ii) difference between the energy removed from the a cell during a period of time and a fraction of the temperature rise of the battery over the same period of time, and wherein the current shuttling between the battery and the electrical storage element occurs within a time interval based on a departure time of the vehicle, the departure time input by a user, such that a power capability of the battery reaches a pre-specified level, and wherein the current shuttling is automatically started at a time based on the departure time of the vehicle, and wherein the current shuttling between the battery and the electrical storage element is bidirectional, and wherein the current shuttling between the battery and the electrical storage element cycles between the discharging phase and the current charging phase, and continues cycling between the discharging phase and the charging phase until a power capability threshold of the battery has been reached.

2. The method of claim 1 wherein:
the optimization problem comprises one or both of a voltage constraint and a current constraint.

3. The method of claim 2 wherein:
the voltage constraint comprises one or both of a maximum terminal voltage constraint and a minimum terminal voltage constraint.

4. The method of claim 2 wherein:
the current constraint comprises one or both of a maximum charging current and a maximum discharging current.

5. The method of claim 1 wherein the cost is computed over a predicted future time.

6. The method of claim 1 wherein:
the current shuttling between the battery and the electrical storage element is a bi-directional pulse train, and the period of time is the period of a pulse train of current.

7. The method of claim 1 wherein:
the power capability is defined as a product of a maximum continuous current that can be drawn over a fixed time interval from the battery without violating any current constraint, any voltage constraint, and any state of charge constraint.

8. The method of claim 7 wherein:
the voltage constraint comprises one or both of a maximum terminal voltage constraint and a minimum terminal voltage constraint.

9. The method of claim 7 wherein:
the current constraint comprises one or both of a maximum charging current and a maximum discharging current.

10. The method of claim 1 wherein the current is shuttled between the battery and the electrical storage element until a power demand is met.

11. The method of claim 1 wherein:
the optimization problem comprises a voltage constraint comprising a maximum operating voltage constraint and a minimum operating voltage constraint.

12. The method of claim 1 wherein:
the method uses a current trajectory.

13. The method of claim 1 wherein:
the method estimates the power capability.

14. The method of claim 1 wherein:
the electrical storage element stores energy electrostatically.

15. The method of claim 1 wherein:
the electrical storage element stores energy electrochemically.

16. The method of claim 1 wherein:
the current shuttling occurs if an initial temperature of the battery is below a temperature threshold.

17. The method of claim 16 wherein the temperature threshold is 5° C.

18. The method of claim 1 wherein:
the current is a pulsed current with equal durations of charging and discharging phases.

19. The method of claim 1 wherein:
the current shuttling raises the temperature of the battery.

* * * * *

UNITED STATES PATENT AND TRADEMARK OFFICE
CERTIFICATE OF CORRECTION

PATENT NO. : 11,660,980 B2
APPLICATION NO. : 14/959805
DATED : May 30, 2023
INVENTOR(S) : Anna G. Stefanopoulou et al.

It is certified that error appears in the above-identified patent and that said Letters Patent is hereby corrected as shown below:

In the Specification

Column 8, Line 30, "p" should be --$\rho$--.

Column 8, Line 31, "a" should be --$\alpha$--.

Column 10, Line 40, "D" should be --$\mathcal{D}$--.

Column 10, Line 42, "u" should be --$\mathcal{U}$--.

Column 12, Line 65, "el" should be --$e_1$--.

Column 13, Line 10, "V$_4$" should be --$v_4$--.

Column 16, Line 67, "p" should be --$\beta$--.

Signed and Sealed this
Eighteenth Day of July, 2023

Katherine Kelly Vidal
*Director of the United States Patent and Trademark Office*